United States Patent
Yamartino et al.

(10) Patent No.: US 10,269,055 B2
(45) Date of Patent: Apr. 23, 2019

(54) MATCHING USER PROVIDED REPRESENTATIONS OF ITEMS WITH SELLERS OF THOSE ITEMS

(71) Applicant: Pinterest, Inc., San Francisco, CA (US)

(72) Inventors: Michael Yamartino, San Francisco, CA (US); Chao Wang, San Francisco, CA (US); Sridatta Kaustubh Thatipamala, San Francisco, CA (US); Yuan Wei, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 347 days.

(21) Appl. No.: 14/726,929

(22) Filed: Jun. 1, 2015

(65) Prior Publication Data
US 2016/0335692 A1    Nov. 17, 2016

Related U.S. Application Data

(60) Provisional application No. 62/160,456, filed on May 12, 2015.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0625* (2013.01); *G06Q 30/0253* (2013.01); *G06Q 30/0273* (2013.01);
(Continued)

(58) Field of Classification Search
None
See application file for complete search history.

(56) References Cited

U.S. PATENT DOCUMENTS

| 5,579,471 A | 11/1996 | Barber et al. |
| 5,596,690 A | 1/1997 | Stone et al. |

(Continued)

FOREIGN PATENT DOCUMENTS

| CA | 2495046 A1 | 2/2004 |
| JP | 2010250426 A1 | 11/2010 |

(Continued)

OTHER PUBLICATIONS

Ram, "Try Google Image Search With Your Product Image", Dec. 16, 2014, around.io, p. 1. (Year: 2014).*

(Continued)

*Primary Examiner* — William J Allen
*Assistant Examiner* — Maria S. P. Heath
(74) *Attorney, Agent, or Firm* — Athorus, PLLC

(57) ABSTRACT

This disclosure describes systems and methods for matching user provided images that include representations of items with sellers of those items. A management service, as described herein, may provide a web site where users can post images, view images, share images, correspond with other users, etc. The management service may identify items represented in the images and determine one or more sellers that offer those items for sale. When another user requests to view the user provided image, the image, seller information identifying the seller determined to sell the item represented in the image, and/or a purchase control that may be selected by a user to initiate a purchase with the seller is presented.

17 Claims, 14 Drawing Sheets

(52) U.S. Cl.
CPC ..... *G06Q 30/0277* (2013.01); *G06Q 30/0603* (2013.01); *G06Q 30/0641* (2013.01)

(56) References Cited

U.S. PATENT DOCUMENTS

| | | |
|---|---|---|
| 6,446,081 B1 | 9/2002 | Preston |
| 7,117,519 B1 | 10/2006 | Anderson et al. |
| 8,429,168 B1 | 4/2013 | Chechik et al. |
| 8,719,104 B1 * | 5/2014 | Endresen ............... G06Q 30/06 705/27.2 |
| 8,909,563 B1 | 12/2014 | Jing et al. |
| 9,098,741 B1 | 8/2015 | Anguelov et al. |
| 2004/0013286 A1 | 1/2004 | Viola et al. |
| 2005/0031165 A1 | 2/2005 | Olson et al. |
| 2005/0225678 A1 | 10/2005 | Zisserman et al. |
| 2006/0018521 A1 | 1/2006 | Avidan |
| 2006/0112092 A1 | 5/2006 | Ziou et al. |
| 2006/0251292 A1 | 11/2006 | Gokturk et al. |
| 2007/0071323 A1 | 3/2007 | Kontsevich et al. |
| 2007/0177805 A1 | 8/2007 | Gallagher |
| 2007/0286531 A1 | 12/2007 | Fu et al. |
| 2009/0304267 A1 * | 12/2009 | Tapley ................ G06F 17/3025 382/156 |
| 2010/0076867 A1 | 3/2010 | Inoue et al. |
| 2010/0082597 A1 | 4/2010 | Retterath et al. |
| 2010/0106732 A1 | 4/2010 | Atallah et al. |
| 2010/0205142 A1 | 8/2010 | Feulner et al. |
| 2010/0226564 A1 | 9/2010 | Marchesotti et al. |
| 2011/0081090 A1 | 4/2011 | Bouguet et al. |
| 2011/0194761 A1 | 8/2011 | Wang et al. |
| 2011/0268323 A1 | 11/2011 | Gallagher |
| 2011/0320317 A1 * | 12/2011 | Yuan ................. G06Q 30/0601 705/26.61 |
| 2012/0123976 A1 | 5/2012 | Wang et al. |
| 2012/0143856 A1 * | 6/2012 | Klinkigt ............... G06K 9/4671 707/723 |
| 2012/0194681 A1 | 8/2012 | Atsmon et al. |
| 2012/0294520 A1 | 11/2012 | Mei et al. |
| 2013/0007620 A1 | 1/2013 | Barsook et al. |
| 2013/0132236 A1 | 5/2013 | Gokturk et al. |
| 2013/0188886 A1 | 7/2013 | Petrou et al. |
| 2013/0251273 A1 * | 9/2013 | Westphal ............. G06K 9/6201 382/218 |
| 2013/0282712 A1 | 10/2013 | Brandt |
| 2015/0134688 A1 | 5/2015 | Jing et al. |
| 2015/0178317 A1 | 6/2015 | Spielberg |
| 2015/0248429 A1 | 9/2015 | Pregueiro et al. |
| 2016/0005171 A1 | 1/2016 | Watanabe et al. |

FOREIGN PATENT DOCUMENTS

| | | |
|---|---|---|
| JP | 2013167973 A | 8/2013 |
| JP | 2014044481 A | 3/2014 |
| JP | 2014225275 A | 12/2014 |
| WO | 2009155604 A2 | 12/2009 |

OTHER PUBLICATIONS

Extended European Search Report for EP Application No. 14863014.8 dated Mar. 30, 2017.
International Search Report and Written Opinion for PCT Application No. PCT/US2016/031914 dated Aug. 16, 2016.
International Search Report and Written Opinion for PCT Application No. PCT/US2016/055212 dated Dec. 23, 2016.
International Search Report for PCT Application No. PCT/US2014/064871, dated Feb. 6, 2015.

* cited by examiner

MATCHING USER PROVIDED REPRESENTATIONS OF ITEMS WITH SELLERS OF THOSE ITEMS

CROSS-REFERENCE TO RELATED APPLICATIONS

This application claims the benefit of U.S. Provisional Application No. 62/160,456, filed May 12, 2015 entitled "Matching User Provided Representations Of Items With Sellers Of Those Items," which is incorporated herein by reference in its entirety

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with social communities, friends and family, photography, and many others.

Sellers in the e-commerce market typically establish a website that may be visited by users to browse various web pages within the website that include product information relating to products offered for sale by the seller. A user may typically obtain product details, product reviews posted by other users, and/or purchase the item from the seller of the product. Upon purchase of the product, the seller will package and ship the item to a user specified delivery destination.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
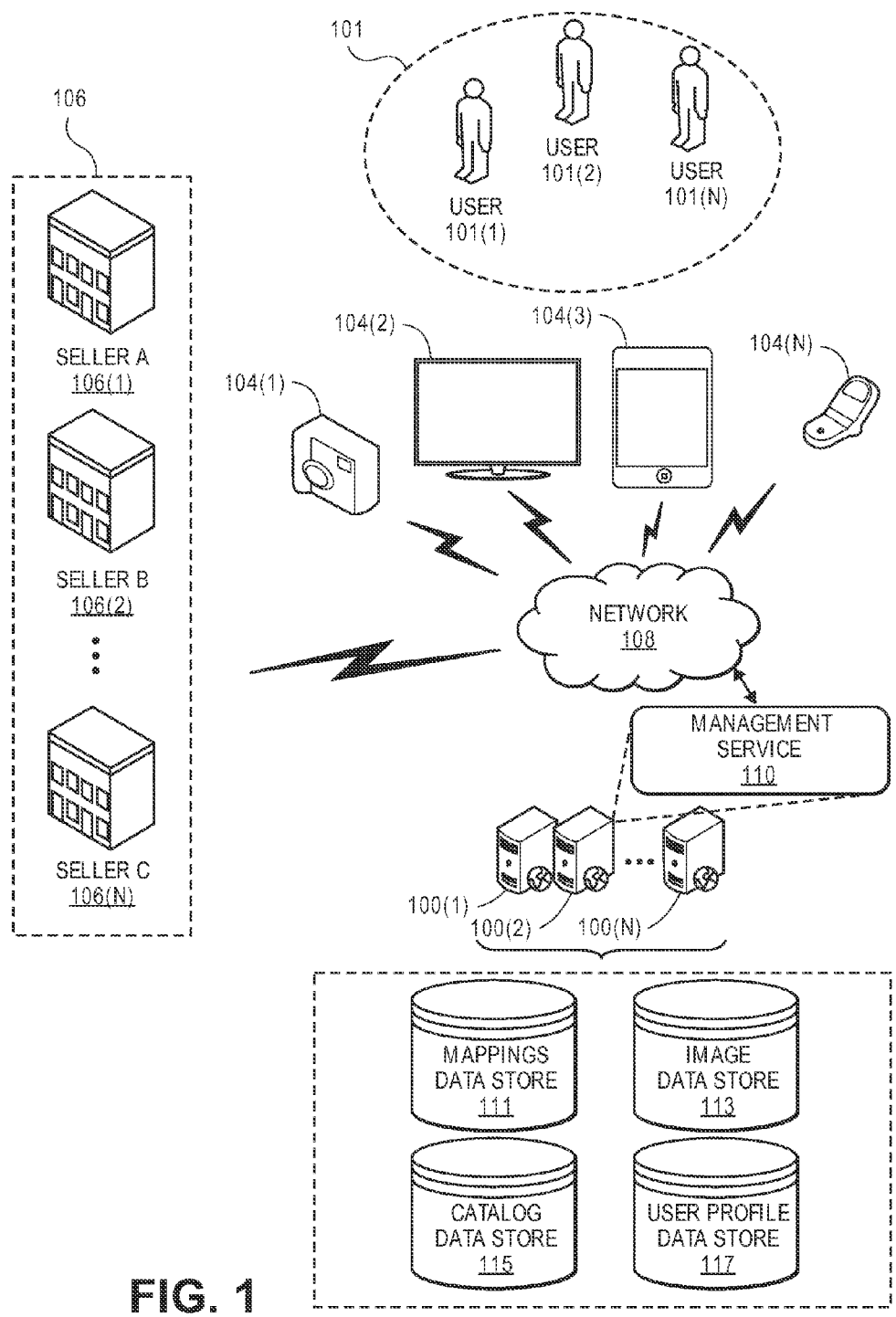
FIG. 1 is a pictorial diagram of an illustrative environment that includes a server system and a client device communicatively connected via a network.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and methods for matching user provided images that include representations of items with sellers of those items. A management service, as described herein, may provide a web site where users can post images, view images, share images, correspond with other users, etc. In the implementations described herein, the management service may identify items represented in the images and determine one or more sellers that offer those items for sale. For example, a seller of items may provide an item catalog to the management service that identifies items offered for sale by the seller that may be purchased by users from the seller. The item catalog may identify the item, a source location identifier, such as Uniform Resource Locator ("URL") of a web page of the seller's website from which the item may be viewed and/or purchased from the seller, an image of the item, item information, image information, etc.

The management service may use the information from the item catalog provided by the seller to determine if any of the images accessible by users of the management service include representations of items offered for sale by the seller. For example, in some instances, users of the management service may post an image to the management service that was obtained from another web page, such as a web page of the seller's website. In such an instance, the posted image may include image information, also known as metadata, which includes the URL from which the image was obtained. If the URL of the image provided by the user corresponds with a URL included in the item catalog, it may be determined that the image provided by the user to the management service includes a representation of an item available for purchase from the seller and the user provided image is associated with the item and/or the seller of the item.

In another example, if the image provided by the user does not include a URL, or the URL included in the image information does not correspond with a URL from the item catalog, the image may be processed using one or more image processing algorithms to detect an item represented in the image. The processed image may then be compared with images and/or image information included in the item catalog provided by the seller to determine if an item offered for sale by the seller is represented in the image. If it is determined that an item offered for sale by the seller is represented in the image provided by the user, the user provided image is associated with the item and/or the seller of the item.

When the user or another user of the management service requests to view the user provided image that has been determined to include a representation of an item offered for sale by the seller, a purchase control is presented with the user provided image. In addition, seller information that identifies the seller and/or the item may likewise be presented with the presentation of the user provided image. The purchase control is selectable by the user viewing the image to obtain variant information about the item represented in the image and/or to purchase the item represented in the image from the seller. Item "variant information," as used herein, is additional information about the item and/or the sale of the item. For example, item variant information may include the quantity of the item available for sale by the seller, the price of the item, a size of the item, a color of the item, a shipping cost for shipping the item, a shipping time, and/or other information.

If a user requests to purchase an item represented in a user provided image from a seller that has been determined to offer the represented item for sale, the management service facilitates the purchase between the user and the seller. For example, the management service may provide an item identifier, item information (e.g., selected variants), user identifier, etc. In some implementations, the management service may likewise facilitate payment by the user for the item, such as through a third party payment processor. Alternatively, payment information may be provided to the seller for processing of payment for the item. Finally, purchase of the item is completed and the seller may ship the item to the user.

An "item" may be anything that can be represented and offered for sale. For example, an item may be a physical good (clothing, hardware, paintings, etc.), a digital item (e.g., audio, video, image), a service (e.g., landscaping, banking, house painting).

FIG. 1 is a pictorial diagram of an illustrative environment that includes users 101, such as users 101(1), 101(2)-101(N), a server system 100 that includes one or more server computers 100(1), 100(2)-100(N), one or more client devices 104, such as client device 104(1), 104(2), 104(3)-104(N), and one or more sellers 106, such as a Seller A 106(1), Seller B 106(2)-Seller C 106(N) communicatively connected via a network 108. As will be appreciated, any number and/or type of server systems 100, client devices 104 and/or sellers 106 may be included in the environment, and those illustrated in FIG. 1 are only exemplary. Likewise, any number of users 101 may be included in the environment. For purposes of this discussion, the term "user" will be used herein to refer to an individual interacting with the management service 110 (discussed below) to post or otherwise provide images, view images, share images, correspond with other users, purchase items represented in viewed images, etc.

The network 108 may include a local area network, a wide area network, such as a public switched telephone network (PSTN), a cable television network, a satellite network, a collection of networks, a public Internet protocol network, a private Internet protocol network, or a combination thereof. Moreover, the network 108 may be wired, wireless, or a combination of the two. The server system 100 may also include a mappings data store 111, an image data store 113, an item catalog data store 115, and/or a user profile data store 117. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The mappings data store 111, image data store 113, item catalog data store 115, and user profile data store 117 may be integrated with the server system 100 or otherwise communicatively coupled with the server system 100. For example, one or more of the mappings data store 111, image data store 113, item catalog data store 115, and/or user profile data store 117 may be located at a remote computing resource (not shown) and communicatively coupled with the server system 100. In some implementations, the mappings data store 111, image data store 113, item catalog data store 115, and/or user profile data store 117 may include one or more CD-RW/DVD-RW drives, hard disk drives, tape drives, or other storage devices that are utilized to store digital content and information. The server system 100, separately or together with the mappings data store 111, image data store 113, item catalog data store 115, and/or user profile data store 117, may provide a management service 110 that facilitates user 101 postings of images, viewing of images, sharing of images, corresponding with other users, viewing of item variant information for items represented in images, and the like. Likewise, the management service 110 may facilitate the purchase by a user of a user provided item represented in an image from a determined seller of the item.

The server system 100 may also be configured to exchange information with one or more sellers 106. The sellers 106 may include any type of entity and/or individual(s) that offers items for sale. For example, sellers 106 may include e-commerce websites that sells and delivers items, a service offering, a traditional retail or wholesale store, etc.

In some implementations, the sellers 106 may interact with the management service 110 and provide and/or update an item catalog listing items offered for sale by the seller. The item catalog may include item information about each item offered for sale by the seller. For example, the item information may include a name of the item, a price of the item, a URL for the seller's web page from which the item may be viewed and/or purchased from the seller, a geographic location of the seller, an advertising amount the seller is willing to pay to advertise the item and/or have a user provided image associated with the item, etc. For example, a seller may offer for sale thousands of items via their own e-commerce website and each of those items may be associated with or represented on one or more web pages of the seller's website. The seller 106 may provide to the management service 110 an item catalog listing one, some, or all of the items that the seller offers for sale. As discussed further below, the management service 110 may store the seller provided item catalog in the item catalog data store 115 and determine if any of the user provided images maintained in the image data store 113 include a representation of an item listed in the item catalog provided by the seller. Images maintained in the image data store 113 that include a representation of an item identified by the seller in the item catalog are associated with the item and/or the seller. The association is maintained in the mappings data store 111.

The advertising amount may identify an amount the seller is willing to pay to promote the item, to have the item associated with user provided images that include representations of the item, and the like. In some implementations, the advertising amount may be based on the number of views or impressions the item receives by users of the management service. In other implementations, the advertising amount may be for a defined period of time, etc. In implementations when more than one seller offers a same or similar item for sale, the advertising amount may be utilized as a factor in determining which seller(s) is associated with a user provided image that includes a representation of the item.

Sellers 106 may also periodically update the provided item catalog by identifying additional items that the seller offers for sale, removing items from the item catalog, by providing updated variant information for items identified in the item catalog and/or by altering the advertising amount for the item. Those updates are reflected in the item catalog data store 115 and may be used by the management service 110 when presenting images to users.

Returning to FIG. 1, client devices 104 may include personal computers, tablet computers, eBook reader devices, laptop computers, desktop computers, netbooks, personal digital assistants (PDA), portable gaming devices, wireless communication devices, such as smart phones or mobile handsets, set-top-boxes, game consoles, cameras, audio recorders/players, or any combination thereof. As will be described with regard to the implementations shown herein, the server system 100 is configured to exchange data and information, including information about users, images, sellers, items, item variants, and other like information with client devices 104. For example, the management service 110 may interact via the server system 100 to present images to a user 101, present item variant information to a user 101, facilitate purchase of an item between a user and a seller of the item, and the like.

Likewise, a user 101 may interact with the management service 110, via a client device 104, to provide images, view images, share images, correspond with other users, initiate a purchase of an item from a seller of the item, etc. As described herein, a user that provides an image that includes a representation of an item is a different person or entity that is determined to be a seller of the item represented in the image.

The mappings data store 111 stores information about the associations between items represented in user provided images and items offered for sale by sellers. For example, an item may be determined to be represented in a user provided image that is available for sale (listed in an item catalog) from three different sellers. In such an example, the mappings data store 111 will maintain an association between the user provided image, which is maintained in the image data store 113, and the corresponding item listed in each of the seller's provided item catalogs.

The user profile data store 117 stores information about users 101 of the management service 110. Any type of information may be stored in the user profile data store 117. For example, user profile information, such as attributes, name, address, gender, browse history, purchase history, billing information, shipping information, purchasing information, social networks and/or friends with which the user 101 interacts, and the like, may be stored in the user profile data store 117. User profile information may be provided directly by users 101 and/or collected from users 101 of the client devices 104 when interacting with the management service 110 (e.g., clickstream data as the user explores the management service 110), when posting, viewing, and/or sharing images, when facilitating a purchase between the user and a seller, etc. In some implementations, users of the management service 110 may choose to limit the amount of information included in their user profile, to limit access to their user profile information and/or to limit what information is shared, if any, from their user profile information. The user profile information maintained in the user profile data store 117 may be used by the management service 110 to facilitate a purchase of an item by a user from a seller.

In addition to maintaining information about mappings, item catalogs, images, and users, the management service 110 may provide use information back to the users 101 and/or the sellers 106. For example, the management service 110, through communication between the server system 100 and a client device 104, may provide use and/or purchase information (e.g., purchase history) back to a user 101. Such information may include an identification of images recently viewed, provided or shared, an identification of others that have viewed images posted by the user, purchases of items made by the user, and the like. Likewise, the management service 110, through communication between the server system 100 and the sellers 106, may provide information to the sellers 106. Such information may include analytics about items offered for sale by the seller, such as how many user provided images include a representation of each item, purchase history for items, etc.

Figure 2:
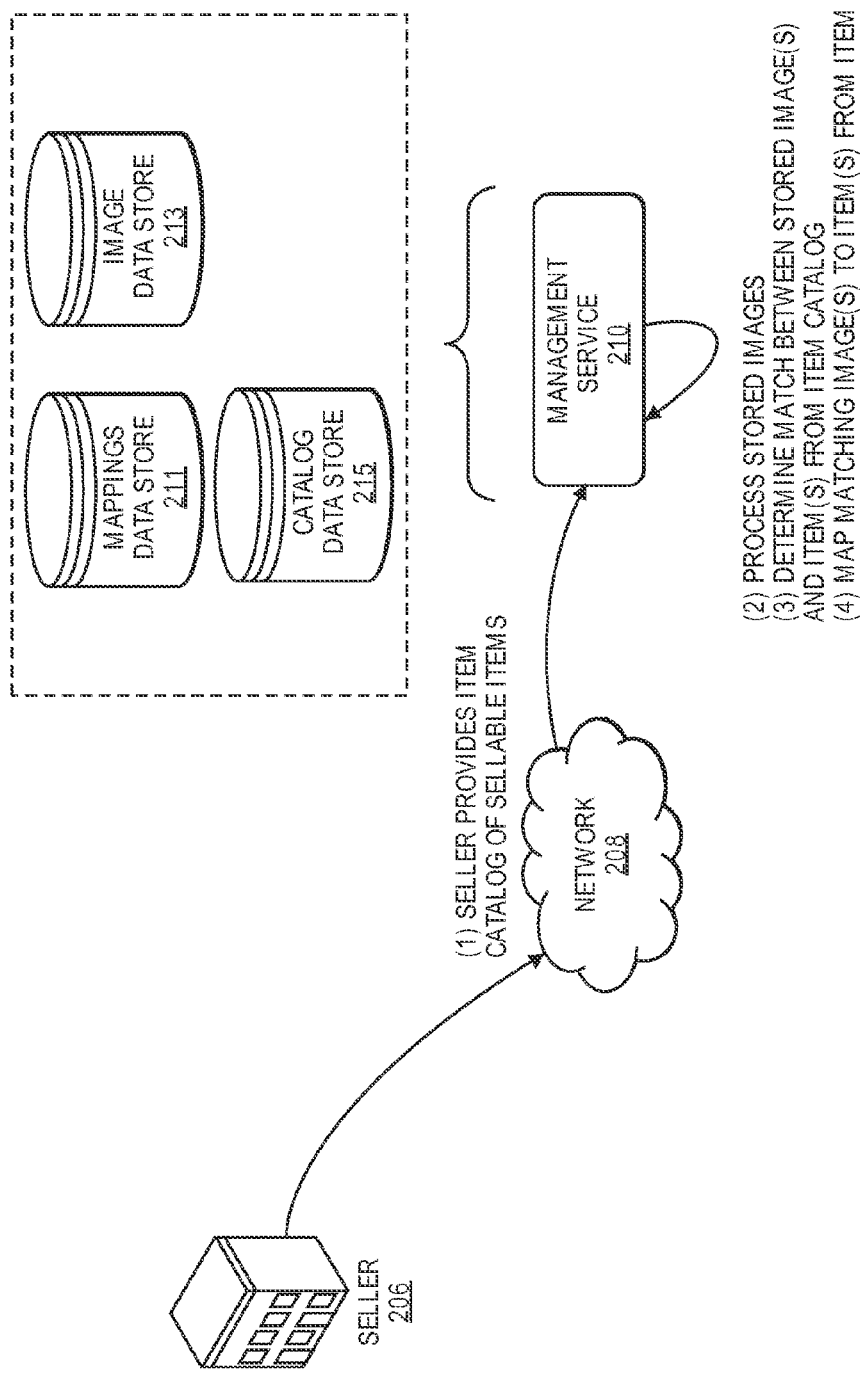
FIGS. 2-3 are block diagrams of an example implementation for matching a seller of an item with a user provided representation of the item, according to an implementation.
Figure 3:
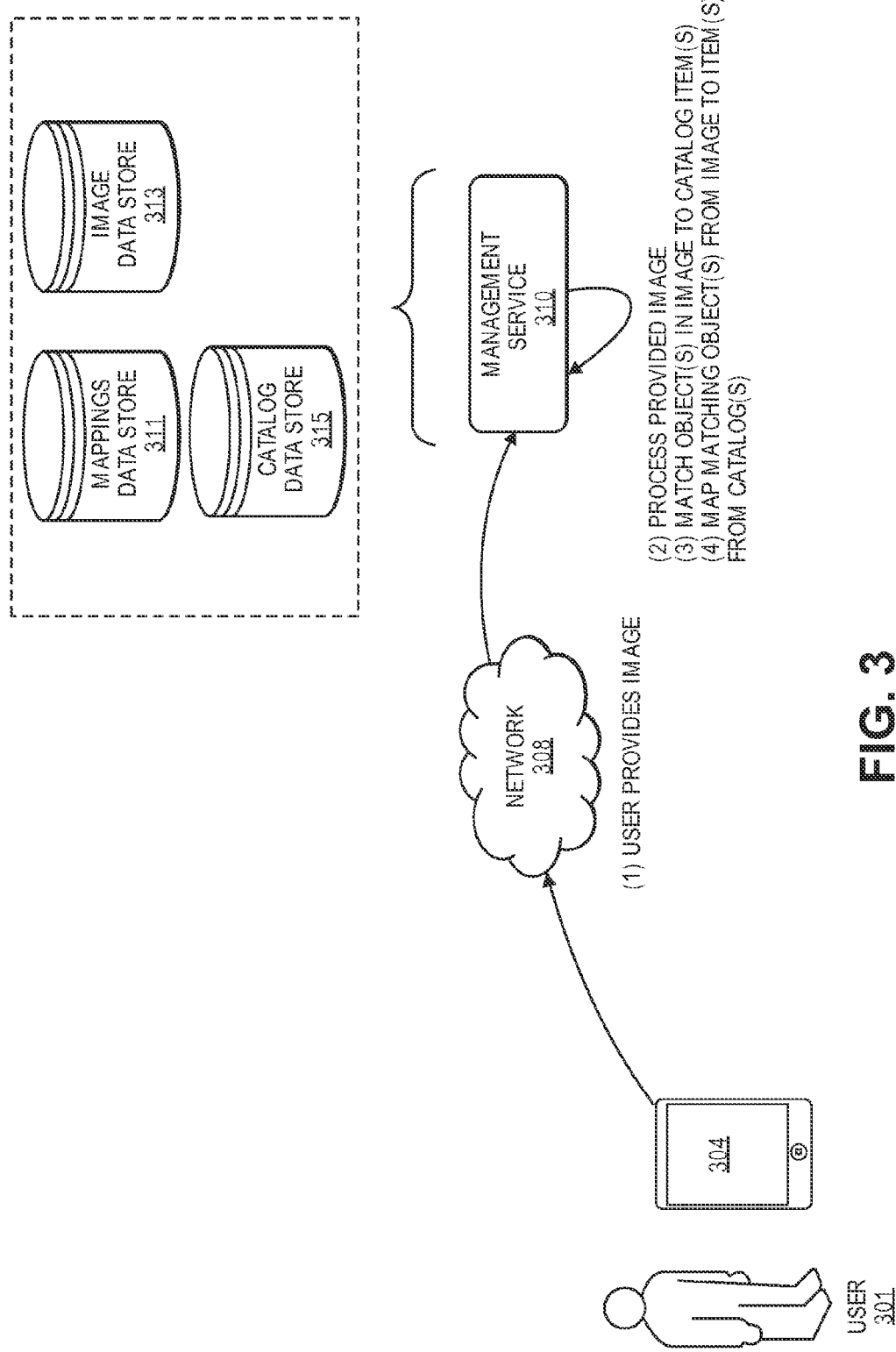

FIGS. 2-3 are block diagrams of an example implementation for matching a seller 206 of an item with a user provided representation of the item, according to an implementation. The example implementation begins with a seller 206 providing an item catalog that identifies one or more items offered for sale by the seller 206. The item catalog is delivered over the network 208 to the management service 210 and the management service 210 stores the item catalog in an item catalog data store 215. The management service 210, upon receiving an item catalog from the seller 206, processes user provided images that are stored in the image data store 213, referred to as stored images, to determine if any of the stored images include a representation of an item identified in the item catalog as an item offered for sale by the user.

Processing of the stored images may be incrementally performed. For example, an initial processing may include comparing a source location identifier, such as a URL, listed in the item catalog for an item, with source location identifier included in the image information of the stored images to determine if any of the source location identifiers are the same or similar. For example, if the source location identifiers are URLs, it may be determined that a source location identifier of an existing image is the same as a source location identifier listed in the item catalog if the two URLs are the same. Likewise, it may be determined that a source location identifier of a stored image is similar to a source location identifier listed in the item catalog if the two URLs have a same domain address (are from the same website or domain).

If the source location identifiers are the same, it may be determined that the stored image includes a representation of an item offered for sale by the seller. If the stored image includes a source location identifier that is similar to that of a source location identifier included in the item catalog, the stored image may also be processed using one or more image processing algorithms to determine if the stored image is similar to the image or image information included in the item catalog that corresponds with the similar source location identifier. For example, a hash value may be determined for the stored image and compared to a hash value included in the item catalog. Alternatively, one or more image processing algorithms, such as an edge detection algorithm, object detection algorithm, etc., may be utilized to determine features of the stored image, which may be represented as feature vectors. Images provided with the item catalog may likewise be processed to generate feature vectors (or feature vectors may be provided with the item catalog). The feature vectors of a stored image may then be compared with feature vectors for the item(s) identified in the item catalog with the similar source location identifier and, if the feature vectors are similar, it may be determined that the stored image includes a representation of an item offered for sale by the seller. In some implementations, the additional processing of the images may likewise be performed for images with a same source location identifier.

A source location identifier may be any location, physical or virtual, that is associated with an item and/or any other identifier that can be used to identify the item. For example, as discussed above, a source location identifier may be URL of a webpage at which information relating to the item may be obtained. In another implementations, the source location identifier may include physical coordinates of one or more physical locations (e.g., physical stores of the seller) where the item may be viewed and/or purchased. In such an implementation, a user provided image may include location information, such as global positioning system (GPS) coordinates, that are compared with the coordinates included in the item catalog. In still other implementations, the source location identifier may include a universal product code (UPC), barcode, bokode, etc. that is associated with the item.

In some implementations, stored images that are not matched to an item of the item catalog as part of the initial processing may be further processed. For example, using the feature vectors for the processed stored image, it may be determined if an item is represented in the image and, if so, a category for the item may be determined. For example, the management service may maintain a list of item categories and corresponding feature vectors that are representative of items associated with the item category. Item categories may be any type of classification or categorization of items. For example, item categories may include shoes, shirts, bags, sporting equipment, clothing, hats, cars, etc. For each item category, feature vectors, colors, shapes, and/or other characteristics of items associated with that category are maintained and may be used to compare with feature vectors and/or other information of the stored image. If there is a similarity between the feature vectors and/or other information associated with the item category and the feature vectors and/or other information of the stored image, the stored image may be associated with that item category.

Likewise, the seller and/or items identified in the item catalog as offered for sale by the seller may also be associated with an item category. Associating items identified by a seller as associated with a category may be done in a similar manner to that discussed above with respect to associating a stored image with a category. Alternatively, or in addition thereto, the seller may identify the category for the item, for example, by identifying an item category for each item listed in the item catalog.

Based on the category determined for the stored image and the categories associated with the sellers 206 and/or items offered for sale by sellers, it is determined whether the stored image potentially includes a representation of an item listed in the provided item catalog. For example, if the item category determined for the stored image corresponds to an item category associated with the seller and/or the item catalog provided by the seller, it may be determined that the stored image potentially includes a representation of an item offered for sale by the seller. If the stored image does include a representation of an item that may be listed in the item catalog, additional processing may be performed to determine the item represented in the image. The additional processing may include additional analysis of the stored image and/or comparison of the feature vectors and/or other image information between the stored image and items of the item catalog associated with the same item category. In another example, the stored image may be manually reviewed by a human and compared to items listed in the item catalog having the same item category to determine if the item represented in the image corresponds to an item listed in the item catalog. The human may be an employee of the management service 210, an independent reviewer, a user (or group of users) of the management service 210, a representative or employee of the seller 206, etc.

If it is determined that a stored image includes a representation of an item listed in the item catalog provided by a seller 206, the management service establishes an association between the item listed in the item catalog and the stored image and stores the association in the mappings data store 211. Likewise, the management service may establish an association between the stored image and the seller 206 and maintain that association in the mappings data store 211. As discussed further below, when a user requests to view a stored image, the management service 210 determines the association between the stored image and the item offered for sale by the seller and presents seller information and/or a purchase control with the presentation of the item.

Turning now to FIG. 3, a user 301 may also provide an image that may be matched with an item offered for sale by a seller. In this example, the user 301, using a client device 304, provides an image to the management service 310 via the network 308. The management service, upon receiving the image stores the image in the image data store 313, processes the provided image, and compares the processed image with the items identified in the item catalog data store 315 to determine if the user provided image includes a representation of an item offered for sale by a seller. Processing of the user provided image may be performed in a similar incremental manner as that discussed above with respect to FIG. 2. For example, a source location identifier of the user provided image may be compared with source location identifiers maintained in the item catalog data store 315, the user provided image may be processed to generate feature vectors that are compared with feature vectors for items identified in the item catalog data store 315, image information associated with the user provided image may be compared with image information from the item catalog data store 315, etc.

If the user provided image is determined to include a representation of an item listed in the item catalog data store 315, the user provided image is associated with the item and/or the seller that offers the item for sale and the association is stored in the mappings data store.

Figure 4:
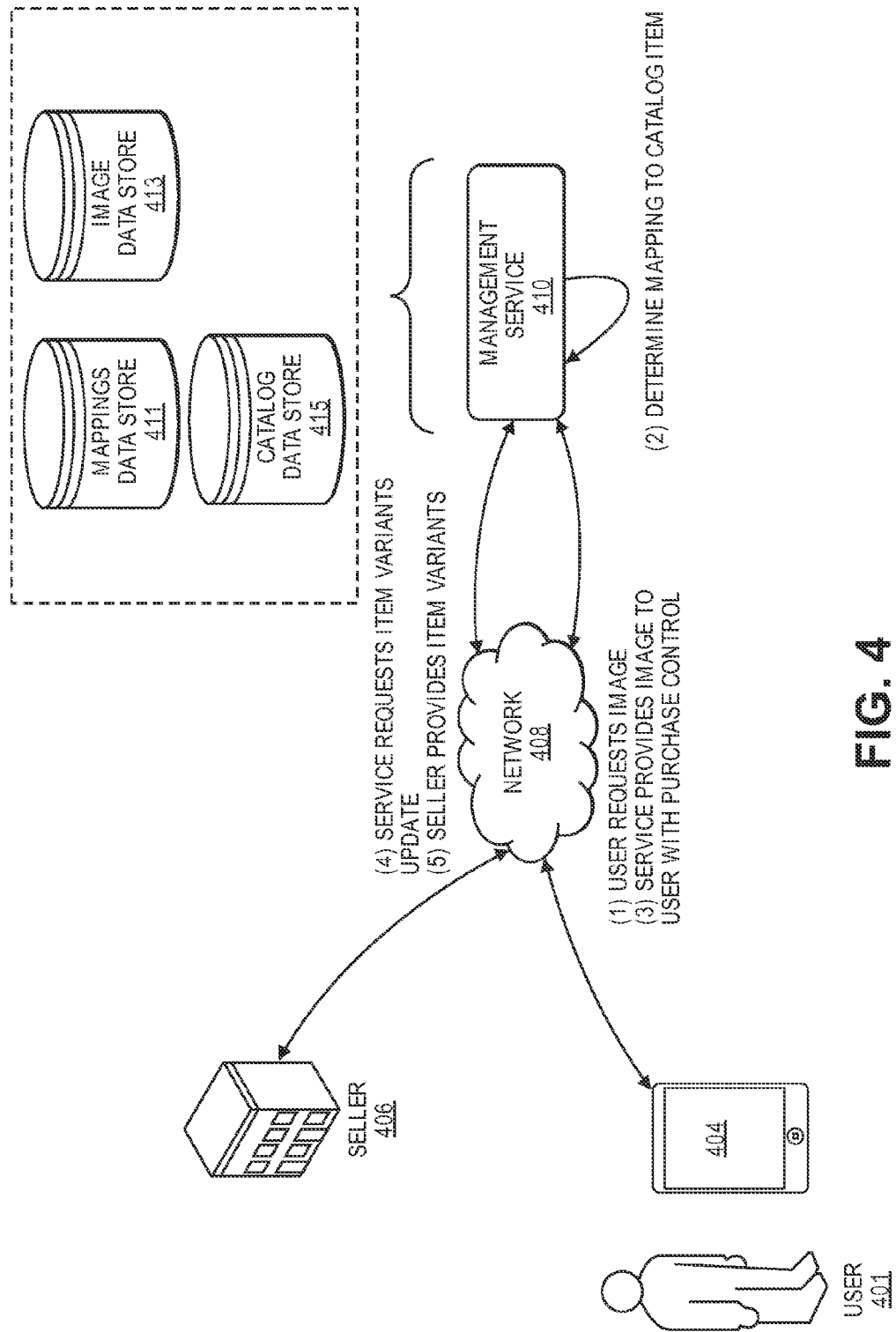
FIGS. 4-5 are block diagrams of an example implementation of facilitating a purchase of a represented item by a user, according to an implementation.
Figure 5:
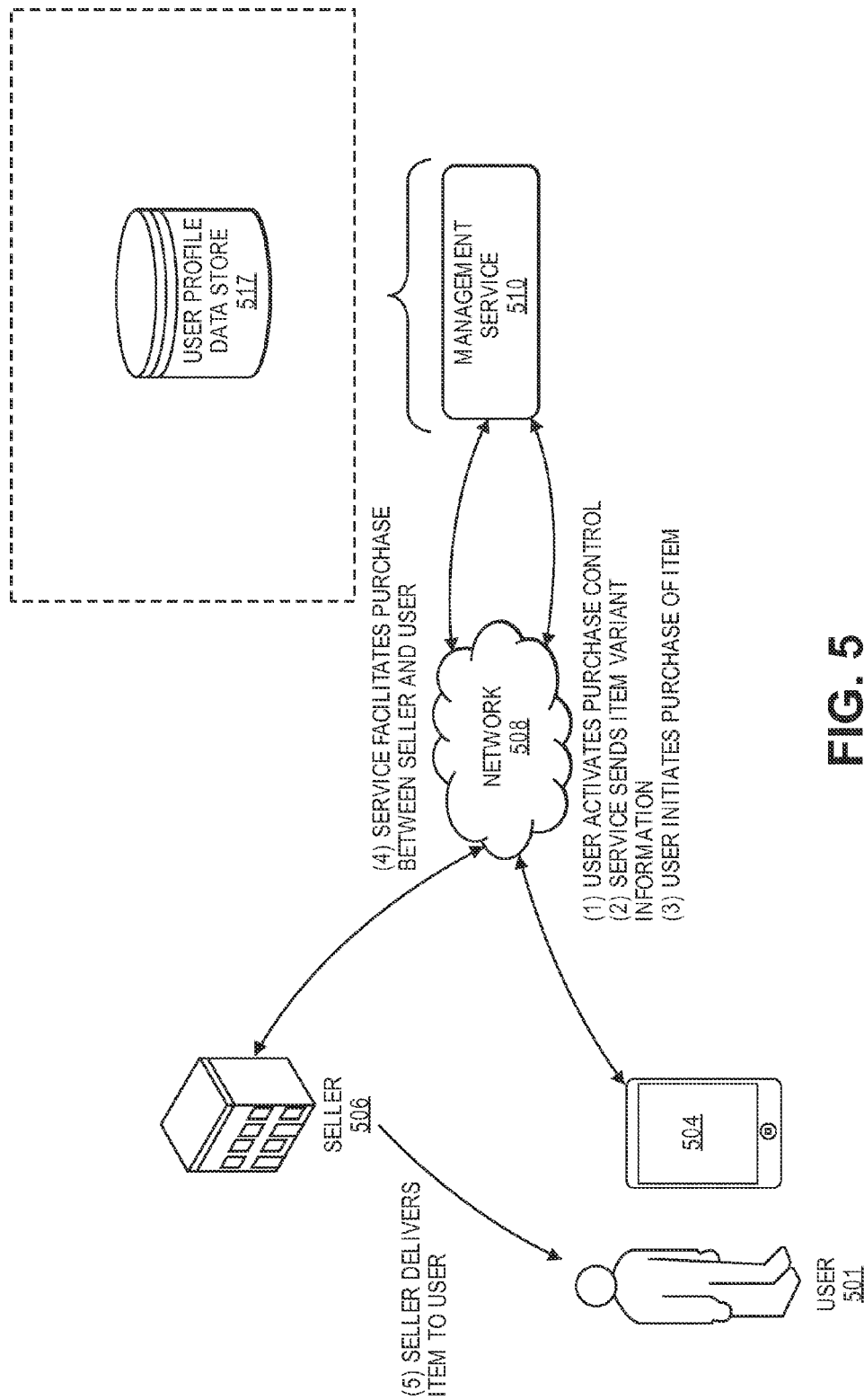

FIGS. 4-5 are block diagrams of an example implementation of facilitating a purchase of a represented item by a user, according to an implementation. Turning first to FIG. 4, the example implementation begins with a user 401 requesting, through a client device 404, to view an image that was provided by a user (the user 401 or any other user) to the management service 410 and stored in the image data store 413. The request is sent from the client device 404 to the management service 410 through a network 408. The management service 410, upon receiving the user's request, queries the mappings data store 411 to determine any associations between the requested image and items offered for sale by a seller. If an association exists between the image requested by the user and an item offered for sale by a seller, as identified in the item catalog data store 415, the management service 410 provides the requested image and a purchase control that is presented to the user. As discussed further below, the purchase control is selectable by the user to obtain additional details about the item represented in the requested image and/or to initiate a purchase of the item from a seller that offers the item for sale. In some implementations, the management service 410 may also provide seller information identifying the seller of the item represented in the image.

In addition to providing the image and purchase control for presentation to the user 401, the management service 410 may also send a request to the seller 406 for item variants related to the item represented in the image that is available for purchase from the seller 406. The seller 406, in response to receiving the request for item variants, may provide the current item variants for the item represented in the image that is available for purchase from the seller 406. In other implementations, rather than, or in addition to the management service 410 sending a request to the seller 406, the seller 406 may periodically send item variant update information to the management service 410. For example, sellers 406 may specify update intervals (e.g., every hour, every day, weekly) and send item catalog and/or item variant updates to the management service that are maintained and used by the management service 410. In some implementations, the sellers 406 may be configured to send item variant updates to the management service 410 when an item variant changes (e.g., price changes, quantity available changes). In such implementations, rather than the management service 410 sending a request to the seller 406 for item variant information, the management service 410 may utilize the previously provided and stored item variant information for the item represented in the requested image.

Turning now to FIG. 5, if a user 501 selects or otherwise activates the purchase control that was provided with the image, the request is sent to the management service 510. For example, the requested image and corresponding purchase control may be sent by the management service 510 to the client device 504, via the network 508, and presented to the user 501 on a display of the client device 504. If the user selects the purchase control, the request is sent by the client device 504, via the network 508, to the management service 510.

In response to receiving the request, the management service 510 sends to the client device 504 item variant information corresponding to the item represented in the image and associated with the selected purchase control. In some implementations, the item variant information may be sent with another image(s) of the item, additional details about the seller and/or the sale of the item.

If the seller selects to purchase the item, as illustrated in FIG. 5, the purchase request is sent from the client device 504 to the management service 510 and the management service 510 facilitates a purchase of the item between the seller 506 of the item and the user 501. In some implementations, the purchase of the item may be completed without the user 501 having to be redirected to the seller's website. For example, the management service may facilitate a payment (e.g., via a third party payment processor) by the user for the item on behalf of the seller and provide the seller with a payment confirmation. In addition to the payment confirmation, the management service 510 may provide the seller with any item variants selected by the user (e.g., size, color, shipping option), a delivery destination specified by the user, etc. In other implementations, payment credentials of the user may be provided by the management service 510 to the seller 506 for processing and order purchase completion. The payment credentials, delivery details, and/or other user related information may be provided by the user 501 to the management service 510 and/or maintained in the user profile data store 517.

The seller 506, upon receiving purchase confirmation or completing the purchase, initiates delivery of the item to the user. For example, if the item is a physical good, the seller 506 may cause the item to be delivered to a user specified delivery location. Likewise, if the item is a digital good, the item may be transmitted from the seller to the user 501, for example, via the network 508. The management service 510 may provide a confirmation message to the user 501 that the purchase of the item from the seller 506 has been completed.

As described, the implementations provide the ability to determine items represented in user provided images and match those items with a seller that offers the item for sale. While the examples described herein refer to a single seller as offering the item for sale, in other implementations, an item represented in a user provided image may be available for sale from multiple sellers. For example, if the item represented in the image is a sports shoe, that item may be available from multiple different sellers of sports shoes. In such an implementation, the user provided image of the item may be associated with each of the sellers and a mapping maintained in the mappings data store maintained by the management service. In some implementations, a single seller may be associated with the purchase control when the user provided image and the corresponding purchase control are sent to a requesting user. The single seller may be randomly selected, selected based on price, selected based on the user's past purchase history, the location of the user and the seller, and/or any other factor. Alternatively, the user may be provided a list of sellers upon activation of the purchase control.

In addition to the management service determining multiple sellers for an item represented in an image, in some implementations, multiple items may be represented in a single user provided image. In such instances, the image may be segmented based on the various positions of the represented items, sellers determined for the different items, and different purchase controls presented with each of those items.

Figure 6:
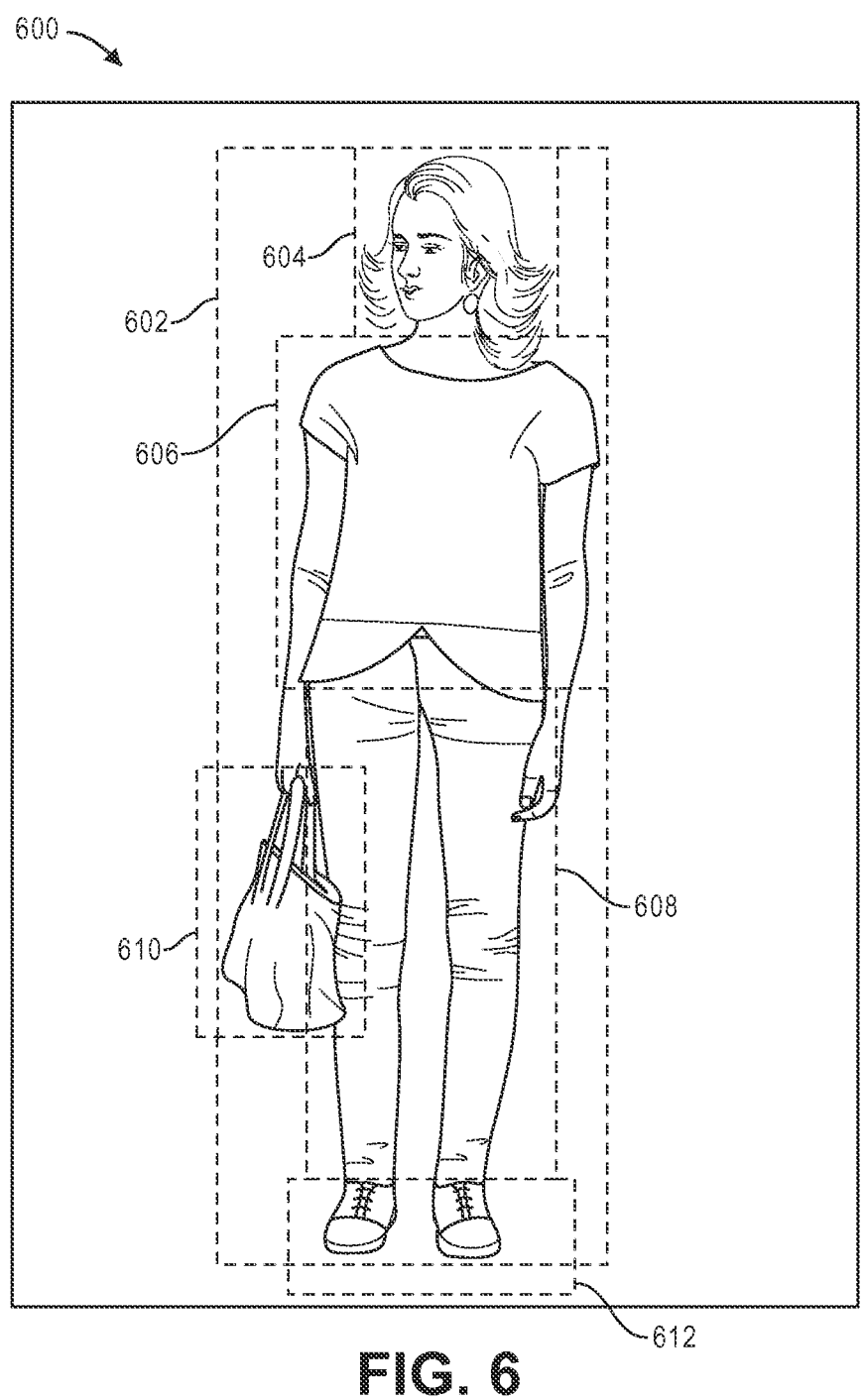
FIG. 6 is a representation of a segmented image, according to an implementation.

For example, referring to FIG. 6, illustrated is a representation of a segmented user provided image that includes a plurality of items offered for sale by different sellers, according to an implementation. An image, such as image 600, may be segmented using image segmentation techniques. For example, a background of the image may be determined (e.g., based on out of focus regions and/or similar colors) and removed from processing. Likewise, six objects have been identified and the image segmented into six different regions. Specifically, a body object 602, a head object 604, a shirt object 606, a pants object 608, a bags object 610, and a shoes object 612. As part of the segmenting, the root object, in this example the body object 602, was determined and the location of other objects 604-612 considered when identifying those other objects. Segmentation of images is described in further detail in U.S. patent application Ser. No. 14/279,871 entitled "Image Based Search," which is herein incorporated by reference in its entirety.

In other implementations, an image may be segmented using other segmentation and identification techniques. For example, images may be segmented using crowd sourcing techniques. For example, as users view an image, they may select regions of the image that include objects and the image may be segmented based on the location of objects within the image. As more users identify objects within images, the confidence of the identity of those objects increases. Based on the user provided segmentation and identification, the objects within the image can be identified and a determination made as to whether the object is an item offered for sale by a seller.

For example, each segment may be processed to generate feature vectors for the item represented in the segment and those feature vectors may be compared with feature vectors associated with items identified in the item catalog data store. Alternatively, or in addition thereto, the segments of the image may be processed and the item classified into one or more categories. For example, the shirt object 606 of the image 600 may be processed to detect the object (shirt) represented in the segment that contains the shirt object 606 and the segment may be associated with a category representative of shirts (or another relevant category). As discussed above, the representation of the object (shirt) may be compared with items offered for sale by sellers associated with the category shirts and/or compared with items offered for sale that are associated with the category shirts to determine if the object represented in the segment of the image corresponds with an item offered for sale by a seller. This processing may be done for each object and/or segment of the image to determine items represented in the image that are offered for sale by one or more sellers.

Figure 7:
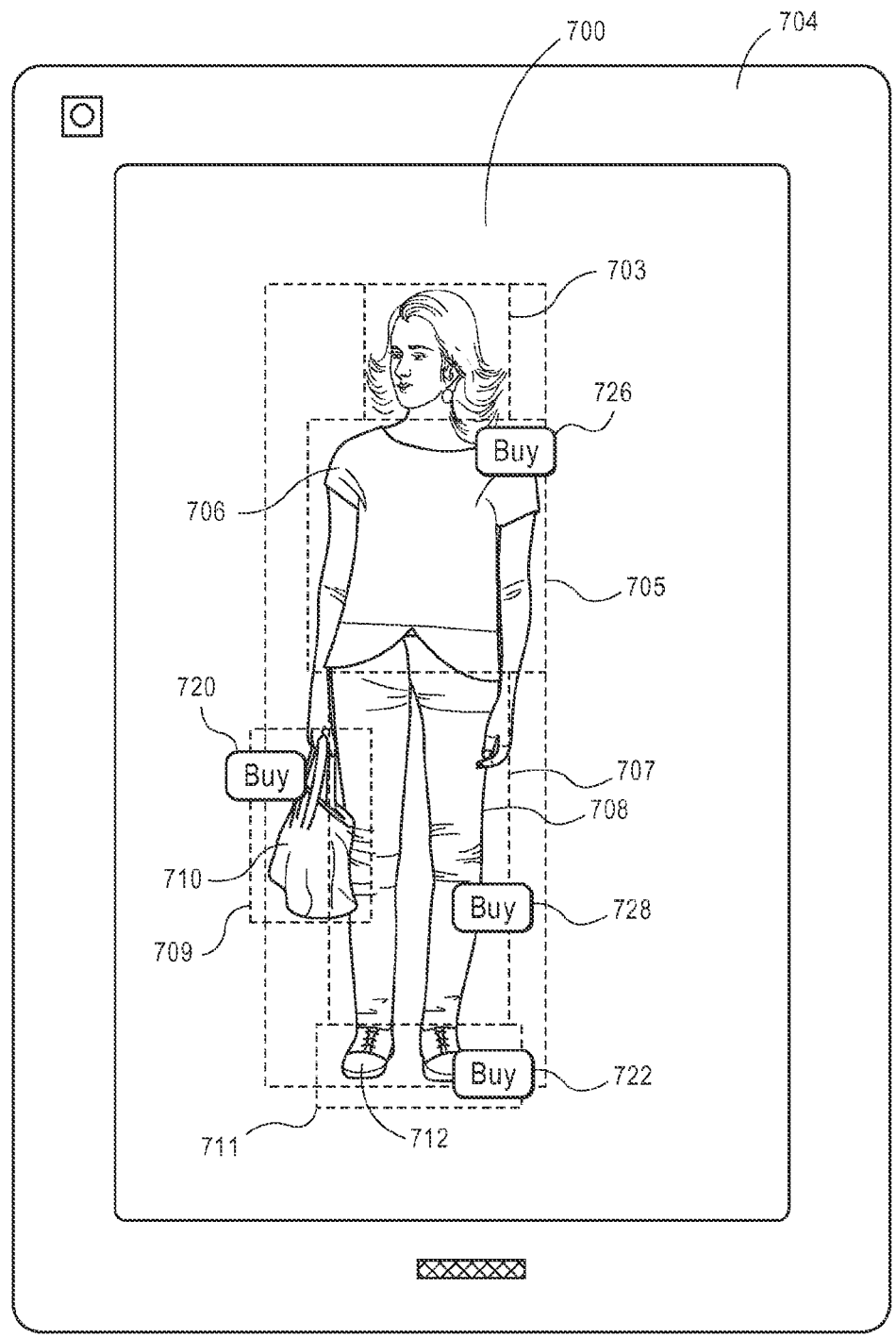
FIG. 7 is a representation of a segmented image with purchase controls associated with represented items available for purchase from one or more sellers, according to an implementation.

FIG. 7 is a representation of a segmented image 700 presented on a display of a client device 704 with purchase controls associated with objects of the image that are determined to be items offered for sale by one or more sellers, according to an implementation. For each item determined in the segmented image to be available for purchase from one or more sellers, a purchase control may be presented near the determined item that is selectable by the user. In this example, a shirt 706 has been determined in a first segment 705 of the image 700 and a purchase control 726 is presented near the presentation of the shirt. Similarly, a bag 710 has been determined in a second segment 709 of the image and a purchase control 720 is presented near the presentation of the bag. A pair of pants 708 has been determined in a third segment 707 of the image 700 and a purchase control 728 is presented near the presentation of the pants 708. Finally, a pair of shoes 712 has been determined in a fourth segment 711 of the image 700 and a purchase control 722 is presented near the presentation of the shoes 712.

While the majority of the segments of the image 700 have been determined to include a representation of an item offered for sale by a seller, the segment 703 that includes the object of a person's head is determined to not include an item that is offered for sale by the seller. Because the object (person's head) represented in the segment 703 is determined to not be an item offered for sale by a seller, a purchase control is not presented near the presentation of that object.

Figure 8:
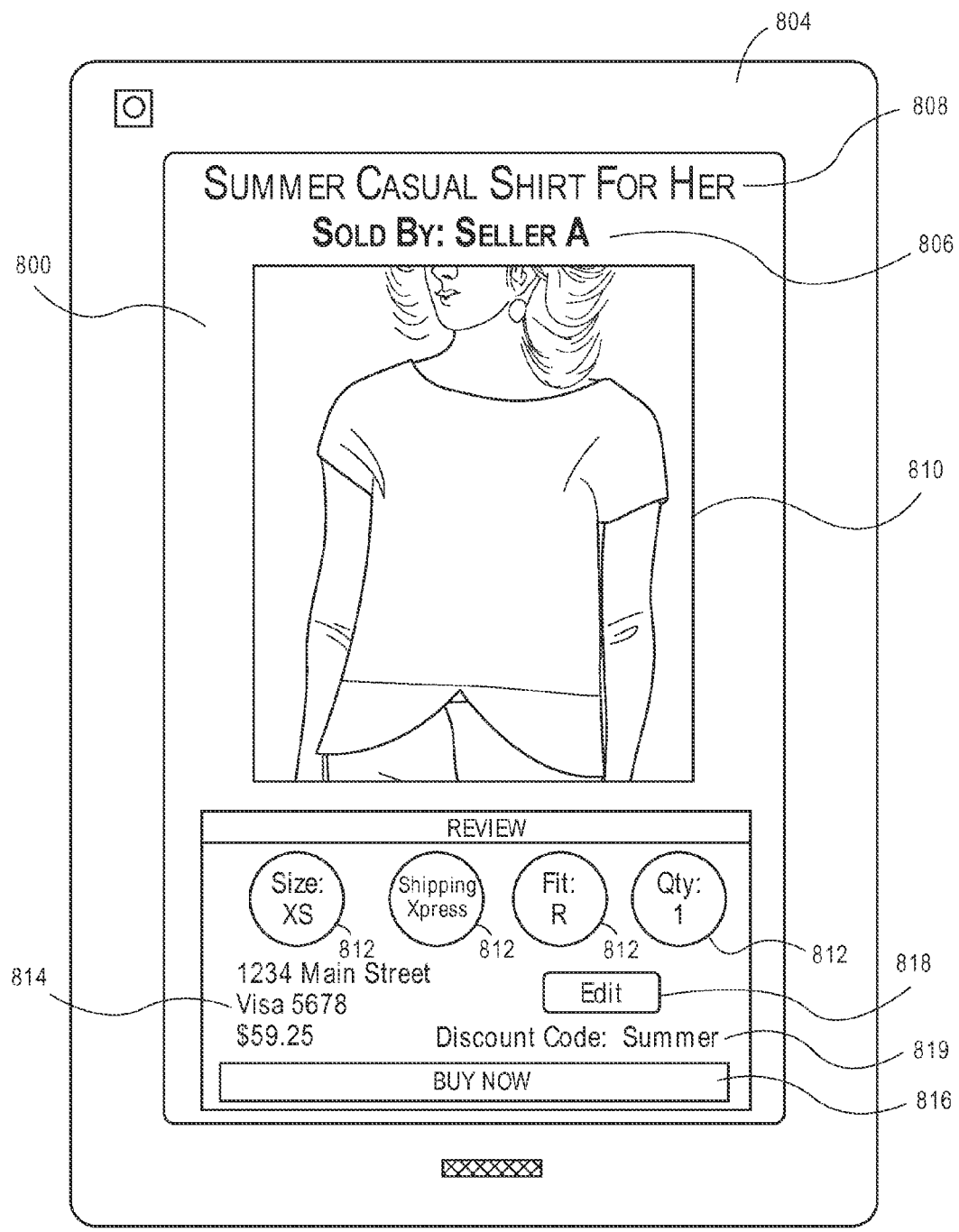
FIG. 8 is a representation of an item and item variants available from the seller of the item, according to an implementation.

A user may view the image 700 on the client device 704 and selectively interact with one or more of the purchase controls to obtain additional details about an item associated with the purchase control. For example, FIG. 8 is a representation of an item and item variants for the shirt item, according to an implementation. The information 800 presented on the display of the client device 804 is generated in response to the user selecting the purchase control 726 (FIG. 7) associated with the shirt item. In this example, upon selection of the purchase control 726, an additional view 810 of the shirt item is presented to the user along with a name 806 of the seller of the item, in this example Seller A, from which the item may be purchased. A name of the item "Summer Casual Shirt For Her" 808 may also be included in the presented information 800. The management service, as discussed above, may also obtain and provide item variant information 812, such as a size, fit, color, shipping method, and/or quantity of the shirt. The user may alter or select item variant information by, for example, interacting with the presentations of the item variant information. In addition, a user may also be presented with purchase and/or shipping information 814 that is currently associated with the user of the client device 804 that will be used by the management service to facilitate a purchase of the item if the user selects the "Buy Now" control 816. A user may alter the purchase and/or shipping information 814 by selecting the "Edit" control 818 and providing or selecting alternative information. Any type or form of payment method may be used with the implementations discussed herein. For example, the user profile maintained by the management service that is associated with the user may include credit card information, as illustrated, that is used to facilitate a purchase between the user and the seller of the item. In other implementations, other forms of payment, such as bank transfers, e-commerce payment processors, etc. may likewise be utilized.

In some implementations, a discount code 819 or other promotion may be associated with the item represented in the additional view 810. For example, if Seller A 806 is offering a promotion for the item that is received if a discount code 819 is provided as part of the checkout process, the discount code 819 may be automatically identified and included in the information 800 presented on the display of the client device 804. In some implementations, the discount code 819 is provided by the seller as an item variant for the item. In other implementations, a user may alter, update or provide a discount code 819 by selecting the discount code 819 and providing such information.

The additional view 810 of the item may be in the form of a digital still image, a video file, an animated .gif file, etc. For example, the additional view 810 may include a presentation of an animated .gif file that can be manipulated by a user to alter a presented view of the item. For example, if the client device 804 includes a touch-based display, a user may manipulate or control the presentation of the .gif file by moving their finger on the touch-based display to obtain different views of the presented item. In one implementation, the user may control the presentation of the image and rotate the image to obtain front, back, side and/or other views of the image, effectively providing a 360 degree view of the image.

In some implementations, a user may view and/or provide comments, reviews, ratings, and/or other information related to the item represented in the additional view 810. In some implementations, a user may also be presented with an identification of related items often viewed or purchased with the item represented in the additional view 810. A related item is an item that is often purchased with the item or view by users when viewing the item represented in the additional view 810. For example, if other users of the management service often purchase the item "Summer Causal Shirt For Her" from Seller A and also purchase a pair of matching shorts, the information 800 may also identify the pair of matching shorts to the user as an item that is often purchased with the item represented in the additional view 810. The user may obtain additional information about the pair of matching shorts by selecting the identified pair of matching shorts.

Figure 9:
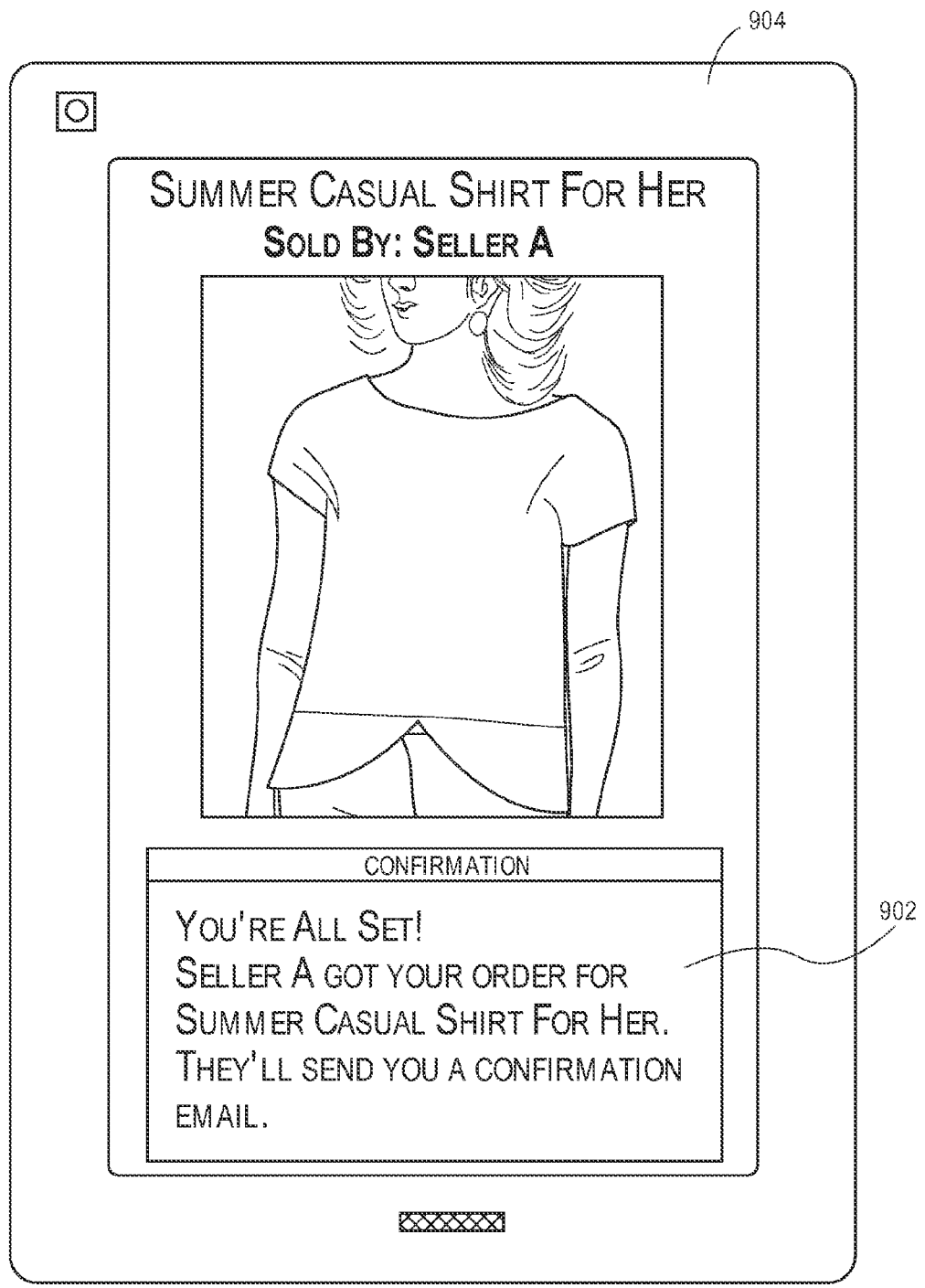
FIG. 9 is a representation of a purchase confirmation for an item, according to an implementation.

If a user selects the "Buy Now" control 816, the management service facilitates a purchase of the item between the user and the seller. Facilitating purchase of the item is discussed further below with respect to FIG. 13. In addition to facilitating purchase, the management service may also send a confirmation message to the user, as illustrated in FIG. 9. In this example, the management service sends to the client device 904 a confirmation message 902 identifying that the seller of the item received the order from the user for the item and that the seller will send the user a confirmation email.

Figure 10:
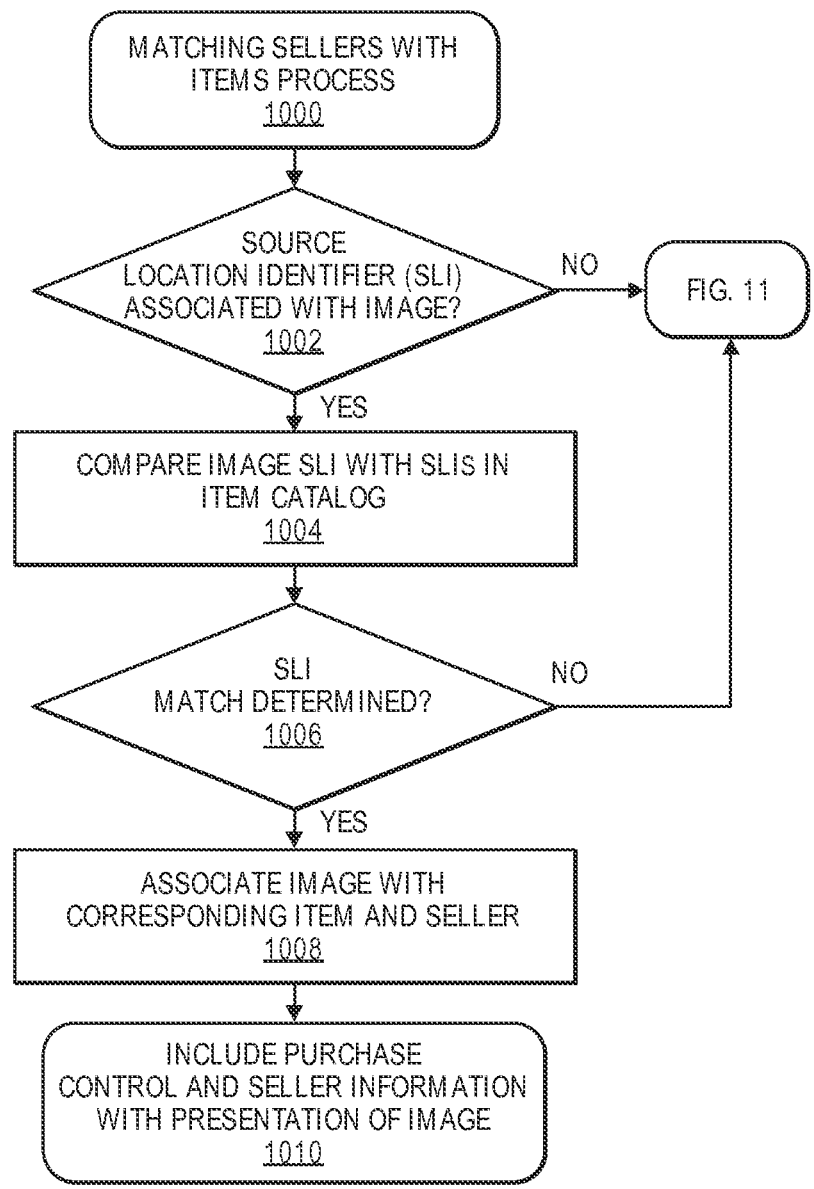
FIG. 10 illustrates an example process for matching sellers with user provided representations of items, according to an implementation.

FIG. 10 illustrates an example process 1000 for matching sellers with items, according to an implementation. The example process 1000 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 1000 begins by determining if there is a source location identifier, such as a URL, GPS coordinates, barcode, etc., included in the image information of a user provided image, as in 1002. As discussed above, a user provided image may be already stored in an image data store of the management service or may be provided to the management service by the user. The user provided image may be any image or representation of an object that is provided by the user to the management service. For example, the user provided image may be an image obtained with an image capture device of a user's client device, an image copied from another website, an image from an electronic message, etc.

An image may include a source location identifier, such as a URL, if the image is obtained from another location (e.g., a website) on a network, such as the Internet. In another example, the source location identifier may identify a physical location at which the image was captured by an image capture device (camera). For example, when a camera obtains an image, it may include in the image information the GPS coordinates (latitude and longitude) identifying the position of the image capture device when the image was obtained.

If it is determined that the user provided image does not include a source location identifier, the example process 1000 proceeds to the example process 1100 discussed below with respect to FIG. 11. However, if it is determined that the user provided images does include a source location identifier, the source location identifier of the user provided image is compared to source location identifiers maintained in the item catalog data store, as in 1004. As discussed above, the item catalog data store maintains a list of items offered for sale by one or more sellers. As the source location identifiers are compared, a determination is made as to whether the source location identifier of the user provided image matches a source location identifier of an item identified in the item catalog, as in 1006.

If it is determined that the source location identifier of the user provided image does not match any of the source location identifiers of the items in the item catalog data store, the example process 1000 proceeds to the example process 1100 discussed below with respect to FIG. 11. If it is determined that the source location identifier of the user provided image does match a source location identifier of an item in the item catalog data store, the user provided image is associated with the corresponding item from the item catalog data store and/or the seller that offers the item for sale, as in 1008. This association is maintained in the mapping data store by the management service.

Based on the association between the user provided image and the item identified in the item catalog data store and/or the seller of the item, each time the user provided image is presented to a user, such as when a user requests to view the user provided image, the presentation of the image will include a purchase control and/or seller information, as in 1010. The purchase control, as discussed above, may be selected by the user to obtain additional information about the item represented in the user provided image and/or to initiate a purchase of the item. The seller information identifies a seller of the item represented in the image. If multiple sellers are associated with the item represented in the image, the seller information may identify one of the sellers, a seller determined based on a provided advertising amount for the item, multiple sellers, provide an indication that more than one seller is offering the item represented in the user provided image for sale, etc. A user requesting to view the user provided image may be the user that provided the image, or any other user of the management service.

While the example illustrated in FIG. 10 describes matching a user provided image with a seller if the source location identifier of the user provided image matches the source location identifier of an item listed in the item catalog data store, in some implementations, additional analysis may be performed before the user provided image is determined to include a representation of the item offered for sale by the seller. For example, the user provided image may be processed to determine if the image is similar to or matches the image or the image information included with the item identified in the item catalog as having a matching source location identifier. In other implementations, additional image information, such as a creation date, file size, hash value, color histogram, etc., may be compared to obtain additional confirmation that the user provided image includes a representation of the item offered for sale by the seller. In some implementations, all or a portion of FIG. 11 may be performed in conjunction with the example process 1000.

Figure 11:
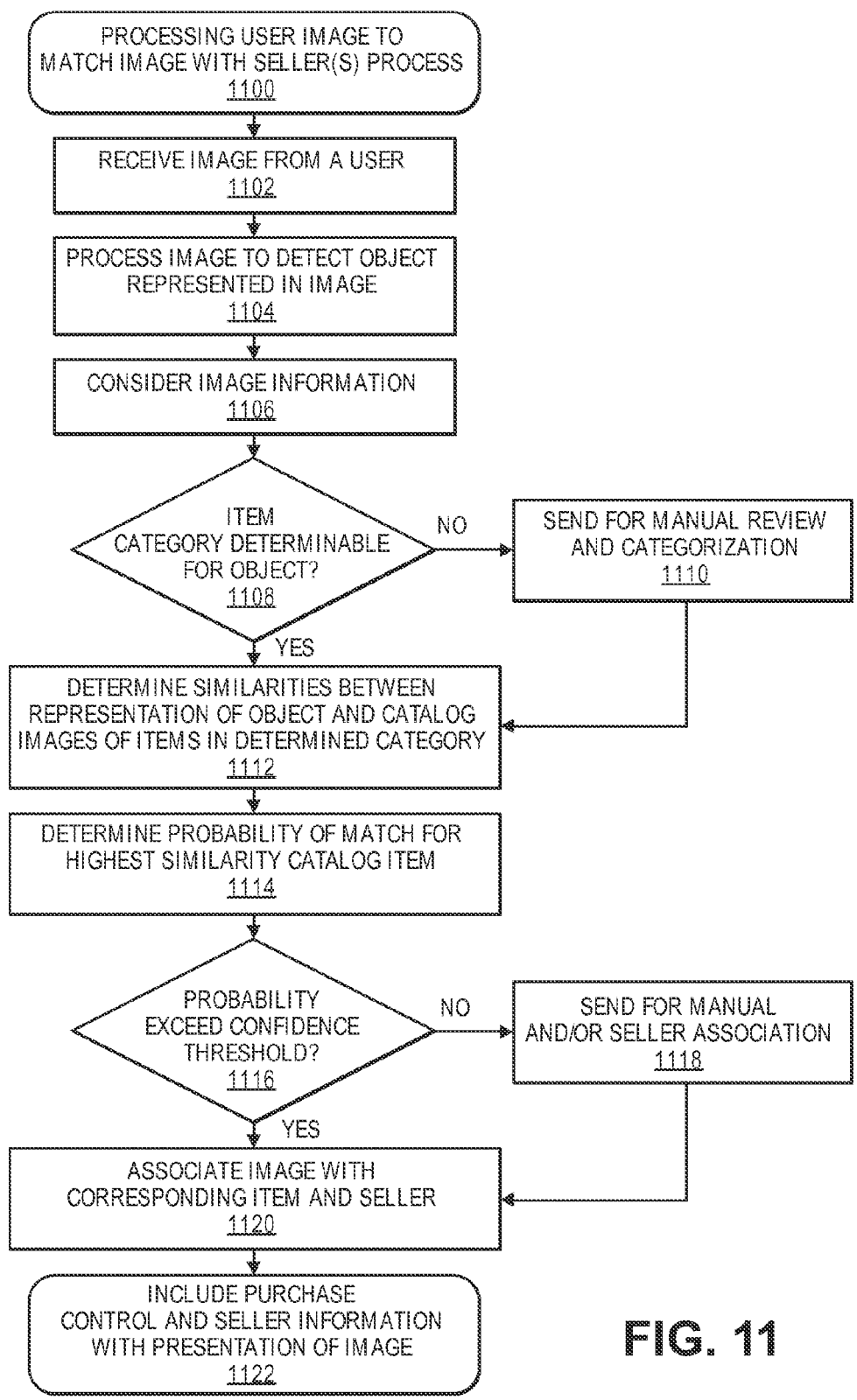
FIG. 11 illustrates an example process for processing a user provided image to match an item represented in the image with a seller of the item, according to an implementation.

FIG. 11 illustrates an example process 1100 for processing a user provided image to match an item represented in the image with a seller of the item, according to an implementation. The example process 1100 begins by receiving the image from a user, as in 1102. The received image is then processed using one or more image processing algorithms, such as edge detection, object detection, grey scale analysis, etc., to determine objects represented in the image, as in 1104. In some implementations, feature vectors representative of the image and/or objects within the image may also be generated.

In addition to processing the image, image information such as source location identifier, comments added by the user that provided the image, comments added by users that viewed and/or shared the image, the time, date and/or location associated with the image, etc., may also be considered, as in 1106. Based on the processed image and the image information, a determination is made as to whether an item category can be determined for an object represented in the image, as in 1108. In some implementations, the management service may maintain a list of item categories for items that are offered for sale by different sellers. Each item category may include one or more item characteristics, such as a description, representative images of items associated with the item category, representative shapes, sizes and/or colors of items that may be associated with the item category, etc. Likewise, a seller may be associated with an item category based on the types of items that the seller offers for sale. Likewise, items offered for sale may be associated with one or more item categories based on the item type.

In determining if the object represented in the user provided image may be associated with an item category, the processed image and/or image information is compared with the characteristics of each item category to determine if the object represented in the image is similar to an item category. For example, the size, shape and/or color of the determined object may be compared with the size(s), shape(s), and color(s) characteristics of an item category to determine a similarity between the object and the item category.

If the object represented in the user provided image cannot be associated with an item category, the image is sent for manual review and categorization, as in 1110. Manual review and categorization may include one or more humans reviewing the user provided image to determine a category for the object represented in the image. The human(s) may be an employee of the management service, a user of the management service, a seller, etc.

If it is determined that the object represented in the image can be associated with a category, or upon manual categorization, similarities between the object represented in the user provided image and the images of the item catalog associated with the determined category are determined, as in 1112. For example, the processed image information (e.g., feature vectors, histogram) from the user provided image may be compared with image information relating to the images corresponding to the items identified in the item catalog to determine a similarity between the images.

Based on the similarities between the user provided image and the stored images, a probability is determined for the stored image having the highest similarity to the user provided image, indicating how likely it is that the stored image corresponds to the user provided images, as in 1114. The probability may be based on a difference between the determined similarity scores. For example, if the highest similarity score is 95% and the next highest similarity scores are 45% and 34%, there may be a high probability that the stored image having the highest similarity score corresponds with the user provided image. In comparison, if the highest similarity score is 95% and the next highest similarity scores are 94% and 93%, even though the images are similar, there is a low probability that the stored image with the highest similarity score corresponds to the user provided image because any of those images may actually include the item represented in the user provided image.

Based on the probability score for the stored image with the highest similarity, a determination is made as to whether the probability exceeds a confidence threshold, as in 1116. The confidence threshold may be any number, score, or other indicator that must be achieved for the probability score to exceed the threshold. The confidence threshold may be different for different images, different users, different times of day, etc.

If the probability score does not exceed the threshold, the image is sent for manual association by one or more humans, as in 1118. In some implementations, the image, image data, stored images associated with items in the item catalog corresponding to the same category, and/or the stored images having the highest similarity scores may also be sent to the one or more humans for manual association. The one or more users may be employees of the management service, employees of the potential seller of the item, users of the management service, etc.

If it is determined that the probability exceeds the confidence threshold, or upon manual association, the user provided image is associated with the item identified in the item catalog and/or the seller of the item identified in the item catalog, as in 1120. This association is maintained in the mapping data store by the management service.

Based on the association between the user provided image and the item identified in the item catalog data store and/or the seller of the item, each time the user provided image is presented to a user, such as when a user requests to view the user provided image, the presentation of the image will include a purchase control and/or seller information, as in 1122. The purchase control, as discussed above, may be selected by the user to obtain additional information about the item represented in the user provided image and/or to initiate a purchase of the item. The seller information identifies a seller of the item represented in the image. If multiple sellers are associated with the item represented in the image, the seller information may identify one of the sellers, a seller based on a provided advertising amount for the item, multiple sellers, provide an indication that more than one seller is offering the item represented in the user provided image for sale, etc. A user requesting to view the user provided image may be the user that provided the image, or any other user of the management service.

Figure 12:
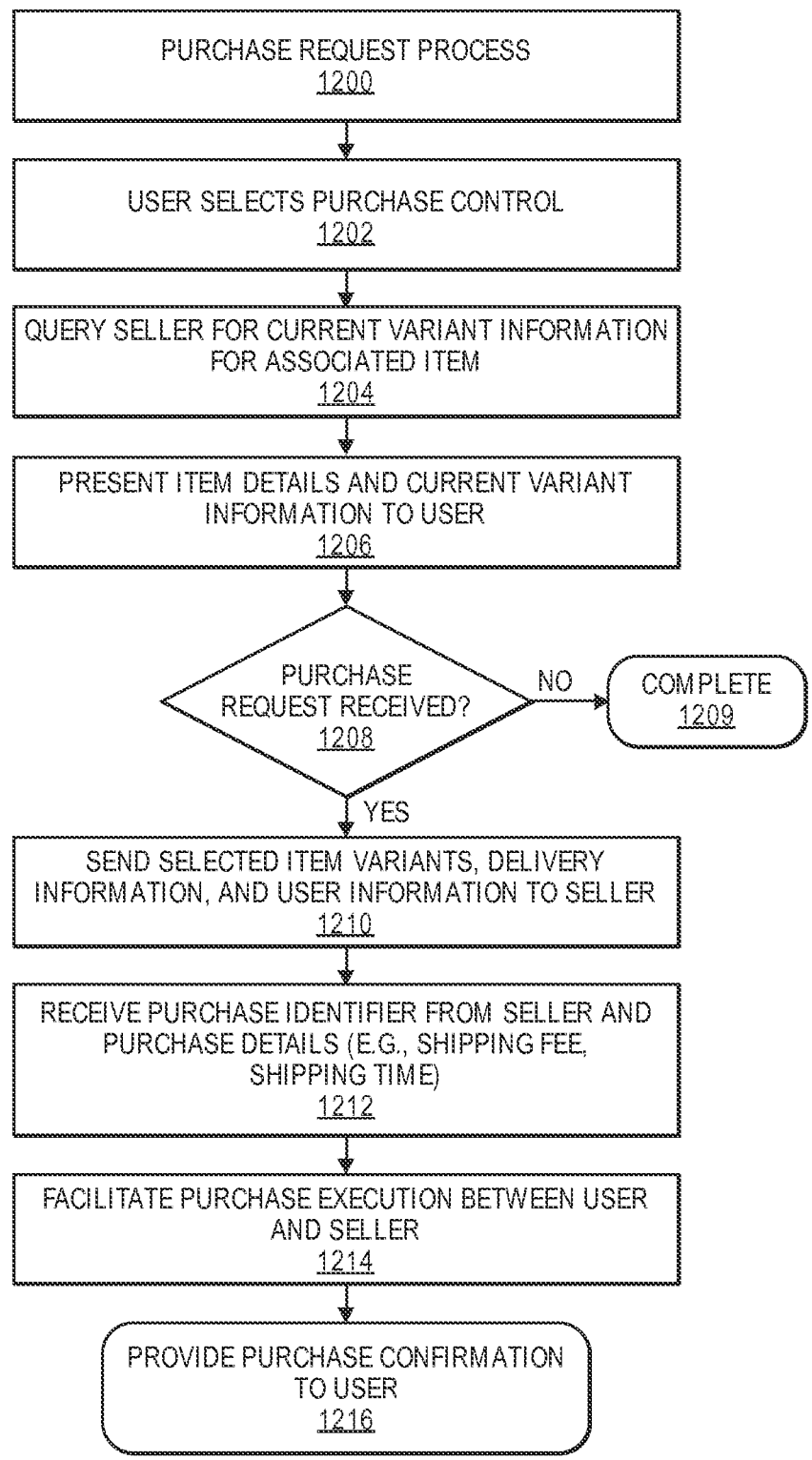
FIG. 12 illustrates an example purchase request process, according to an implementation.

FIG. 12 illustrates an example purchase request process 1200, according to an implementation. The example process 1200 begins upon selection by a user of the purchase control, as in 1202. As discussed above, a purchase control is presented with a user provided image when the user provided image is determined to include a representation of an item offered for sale by a seller.

Upon receiving a selection of a purchase control, the seller is queried for current item variant information corresponding to the item represented in the image, as in 1204. As discussed above, in some implementations, the seller may be queried for item variant information in response to selection of a purchase control, the seller may periodically send item variant information to the management service, and/or the seller may provide updates to item variant information when an item variant changes.

The example process 1200 also sends to the client device of the user, item details and current item variant information for presentation to the user, as in 1206. As illustrated and discussed above with respect to FIG. 8, the presentation to the user may include additional views of the item, current item variant information, purchase details, etc. Likewise, as discussed above, the user may modify and/or select particular item variants for the item that may be used to complete a purchase of the item. For example, the user may select a particular size, color, and/or other variants for an item that may be used in the purchase and/or delivery of the item.

A determination is then made as to whether a purchase request has been received, as in 1208. For example, a user may select to purchase an item upon selecting desired variants and providing purchase details (e.g., delivery destination, credit card information, delivery time). If a purchase request is not received, the example process completes, as in 1209. However, if it is determined that a purchase request has been received, the selected item variants, delivery information, and user information for the user initiating the purchase are sent to the seller of the item, as in 1210.

In response to sending the selected item variants, delivery information, and user information to the seller, the example process 1200 receives from the seller a purchase identifier that identifies the purchase transaction and purchase details (e.g., shipping fee, identification tag, shipping time), as in 1212.

Based on the user provided information, and the seller provided purchase information, the example process 1200 facilitates purchase of the item between the user and the seller, as in 1214. Additional details for facilitating purchase of an item between a user and a seller of the item are discussed in further detail below with respect to FIG. 13. Finally, once the purchase has been completed, a purchase confirmation is sent to the user, as in 1216. The purchase confirmation may be sent in the form of a presentation on the user's client device, an electronic message ("e-mail"), a text message, etc.

Figure 13:
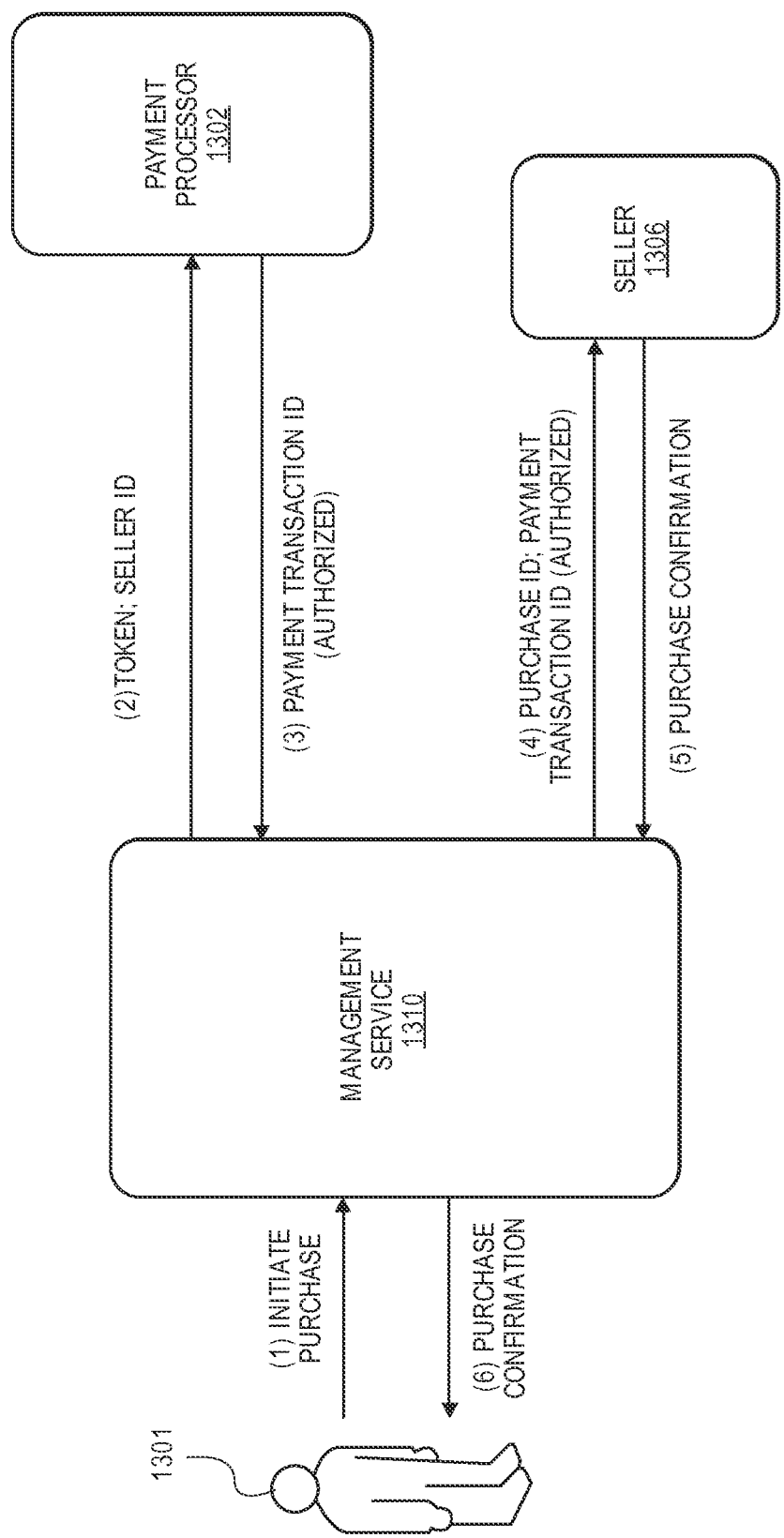
FIG. 13 is a block diagram of a purchase process, according to an implementation.

FIG. 13 is a block diagram of a purchase process, according to an implementation. As discussed above, the management service 1310 may facilitate a purchase of an item between a user 1301 and a seller 1306. In the implementations discussed herein, a user of the management service may purchase an item from a seller other than the management service without ever leaving the website of the management service. At the same time, the seller is able to promote and sell their goods via the management service, even using images provided by users of the management service that are independent of the seller and/or the management service.

When a user 1301 selects desired item variants and initiates a purchase of an item, the management service 1310 receives the purchase request and the selected item variants. The management service may also maintain in the user profile data store purchase information (e.g., credit card, billing information, and delivery information) for the user, and/or the user may provide such information as part of the purchase request.

Based on the relationship between the management service and the seller of the item, payment for the item may be completed differently. In one implementation, the seller of the item may maintain a payment account with a third party payment processor 1302 that accepts payments for purchases facilitated by the management service 1310. In such a configuration, no purchase details of the user are provided to the seller 1306 and the seller remains the seller of record. When a purchase is made, the payment is processed by the third party payment processor 1302 and made to the seller's account that is maintained by the third party payment processor 1302. In another configuration, the seller may be their own payment processor. In such a configuration, the user's purchase details may be provided from the management service 1310 to the seller 1306 and the seller may process payment for the item.

In either configuration, upon receipt by the management service 1310 of a purchase request from a user 1301, the total cost for the purchase (e.g., price, tax, shipping), the payment token that identifies the purchase transaction and the seller identifier is sent to the payment processor 1302 (either the third party payment processor, or the payment processor of the seller). The payment processor 1302 processes and confirms that the payment is authorized and sends back to the management service 1310 a payment transaction identifier and an indication that the payment is authorized.

The management service, upon receiving the payment transaction identifier, sends the payment transaction identifier to the seller 1306 confirming that the purchase has been authorized. The seller, in response, may send a purchase confirmation back to the management service 1310 confirming that the purchase is complete. Likewise, the management service may send a notification to the user confirming that the seller has confirmed purchase of the item. When the seller initiates delivery of the item, the funds may be retrieved from the payment processor and the transaction completed.

In still another implementation, the management service 1310 may prepare a fully configured order that includes the item to be purchased, item variant information (e.g., quantity, color, size), shipping information, user information necessary for the seller to complete a sale of the item to the user (e.g., user information, payment information), and the like. The fully configured order may then be sent directly to the seller 1306. A seller 1306, upon receiving a fully configured order from the management service 1310 processes the order and returns to the management service 1310 either a purchase confirmation or an error indicating that the purchase was not completed for one or more reasons (e.g., invalid payment information). The management service 1310 may send a notification to the user 1301 confirming that the seller has confirmed purchase of the item or that there was an error with the purchase request. If an error occurred, the management service 1310 may obtain from the user, information needed to resolve the error and provide that information to the seller 1306 so that the purchase of the item from the seller can be completed.

Figure 14:
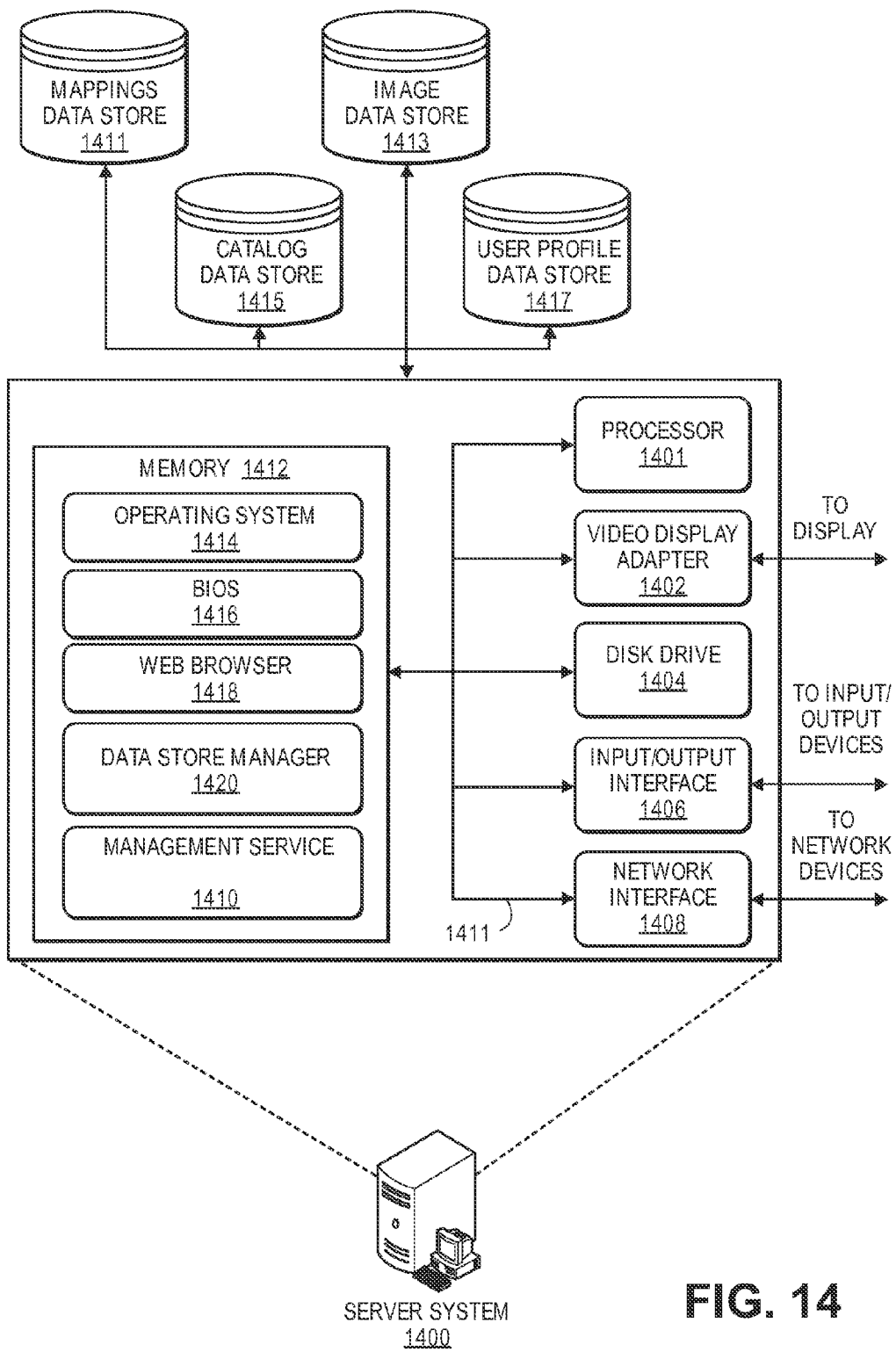
FIG. 14 is a pictorial diagram of an illustrative implementation of a server system that may be used for various implementations.

FIG. 14 is a pictorial diagram of an illustrative implementation of a server system, such as the server system 1400 that may be used in the implementations discussed herein. The server system 1400 may include a processor 1401, such as one or more redundant processors, a video display adapter 1402, a disk drive 1404, an input/output interface 1406, a network interface 1408, and a memory 1412. The processor 1401, the video display adapter 1402, the disk drive 1404, the input/output interface 1406, the network interface 1408, and the memory 1412 may be communicatively coupled to each other by a communication bus 1411.

The video display adapter 1402 provides display signals to a local display (not shown in FIG. 14) permitting an operator of the server system 1400 to monitor and configure operation of the server system 1400. The input/output interface 1406 likewise communicates with external input/output devices not shown in FIG. 14, such as a mouse, keyboard, scanner, or other input and output devices that can be operated by an operator of the server system 1400. The network interface 1408 includes hardware, software, or any combination thereof, to communicate with other computing devices. For example, the network interface 1408 may be configured to provide communications between the server system 1400 and other computing devices, such as the client device 104, via the network 108, as shown in FIG. 1.

The memory 1412 generally comprises random access memory (RAM), read-only memory (ROM), flash memory, and/or other volatile or permanent memory. The memory 1412 is shown storing an operating system 1414 for controlling the operation of the server system 1400. A binary input/output system (BIOS) 1416 for controlling the low-level operation of the server system 1400 is also stored in the memory 1412.

The memory 1412 additionally stores program code and data for providing network services that allow client devices and sellers to exchange information and data files with the server system 1400 and/or the management service 1410. Accordingly, the memory 1412 may store a browser application 1418. The browser application 1418 comprises computer executable instructions, that, when executed by the processor 1401, generate or otherwise obtain configurable markup documents such as Web pages. The browser application 1418 communicates with a data store manager application 1420 to facilitate data exchange and mapping between the mappings data store 1411, the image data store 1413, the item catalog data store 1415, and/or the user profile data store 1417, client devices, such as the client device 104 shown in FIG. 1, and/or sellers, such as the sellers 106 shown in FIG. 1.

As used herein, the term "data store" refers to any device or combination of devices capable of storing, accessing and retrieving data, which may include any combination and number of data servers, databases, data storage devices and data storage media, in any standard, distributed or clustered environment. The server system 1400 can include any appropriate hardware and software for integrating with the data stores 1411-1417 as needed to execute aspects of one or more applications for the client device, the sellers and/or the management service 1410. The server system 1400 provides access control services in cooperation with the data stores 1411-1417 and is able to generate content such as text, graphics, audio, video and/or images to be transferred to a client device and/or sellers.

The data stores 1411-1417 can include several separate data tables, databases or other data storage mechanisms and media for storing data relating to a particular aspect. For example, the data stores 1411-1417 illustrated include mechanisms for storing images, user information, mappings and item catalogs from sellers of items, which can be used to generate and deliver content to client devices and/or sellers (e.g., user provided images and purchase controls) and control actions to be performed.

It should be understood that there can be many other aspects that may be stored in the data stores 1411-1417, such as access rights information, preferred sellers, etc., which can be stored in any of the above listed mechanisms as appropriate or in additional mechanisms of any of the data stores 1411-1417. The data stores 1411-1417 are operable, through logic associated therewith, to receive instructions from the server system 1400 and obtain, update or otherwise process data in response thereto.

The memory 1412 may also include the management service 1410, discussed above. The management service 1410 may be executable by the processor 1401 to implement one or more of the functions of the server system 1400. In one implementation, the management service 1410 may represent instructions embodied in one or more software programs stored in the memory 1412. In another implementation, the management service 1410 can represent hardware, software instructions, or a combination thereof.

The server system 1400, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction in FIG. 14 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A non-transitory computer-readable storage medium storing instructions, the instructions when executed by a processor causing the processor to at least:
   receive, at a management service and from a first seller, a first item catalog that includes at least first item information for an item, wherein:
      the item is offered for sale by the first seller; and
      the first item information indicates at least a first advertising amount the first seller is willing to pay to advertise the item and a first source Uniform Resource Locator ("URL") associated with the item;
   receive, at the management service and from a second seller, a second item catalog that includes at least second item information for the item, wherein:
      the item is offered for sale by the second seller; and
      the second item information indicates at least a second advertising amount the second seller is willing to pay to advertise the item and a second source URL associated with the item;
   subsequent to receipt of the first item catalog and the second item catalog, receive from a first user of the management service, a first image that includes a representation of the item and a first URL;
   compare image information that includes the first URL of the first image with the first item catalog to determine that the item is listed in the first item catalog and that the first seller offers the item for sale, wherein the first user and the first seller are different;
   compare the image information of the first image with the second item catalog to determine that the item is listed in the second item catalog and that the second seller offers the item for sale, wherein the first user and the second seller are different;
   determine a difference between the first advertising amount and the second advertising amount;
   based on the difference between the first advertising amount and the second advertising amount, associate the first image with the listing in the first item catalog;
   store the first image in an image data store of the management service;

subsequent to an association of the first image with the listing and a storage of the first image in the image data store, receive a request from a second user, wherein the second user is different than the first user, the first seller, and the second seller; and in response to the request from the second user, send for presentation to the second user the first image and seller information corresponding to the first seller, wherein the seller information identifies the first seller as a seller of the item represented in the first image.

2. The non-transitory computer-readable storage medium of claim 1, the instructions when executed by the processor further causing the processor to at least:

send for presentation to the second user and concurrent with the first image, a purchase control that is selectable to initiate a purchase of the item from the first seller.

3. The non-transitory computer-readable storage medium of claim 2, the instructions when executed by the processor further causing the processor to at least:

receive from the second user, a selection of the purchase control; and send for presentation to the second user, item variant information, wherein the item variant information includes at least one of a shipping cost for the item, a shipping time for the item, a shipping method for the item, a size of the item, a color of the item, or a quantity of the item.

4. The non-transitory computer-readable storage medium of claim 3, wherein the item variant information is obtained from the first seller in response to receipt of the selection of the purchase control.

5. The non-transitory computer-readable storage medium of claim 3, wherein the item variant information is periodically received from the first seller and maintained by the management service.

6. The non-transitory computer-readable storage medium of claim 1, wherein the first item information includes at least one of a second image representative of the item, a source location identifier associated with the item, or item variant information.

7. The non-transitory computer-readable storage medium of claim 6, wherein the instructions when executed by the processor to cause the processor to compare image information of the first image with the first item catalog, further include instructions that cause the processor to at least:

compare a first Uniform Resource Locator ("URL") associated with the first image with a source URL included in the first item catalog; and determine the item based on a correlation between the first URL and a source URL.

8. The non-transitory computer-readable storage medium of claim 6, wherein the instructions when executed by the processor to cause the processor to compare image information of the first image with the first item catalog, further include instructions that cause the processor to at least:

process the first image with an image processing algorithm to determine a first feature vector representative of the item represented in the first image;

compare the first feature vector with the first item information included in the first item catalog; and determine the item based on similarity between the first feature vector and a stored feature vector maintained in the first item catalog.

9. The non-transitory computer-readable storage medium of claim 6, the instructions when executed by the processor further causing the processor to at least:

process, with an image processing algorithm, a plurality of images maintained in an image data store of the management service;

for each of the plurality of images:
determine a feature vector representative of an item represented in the image;
compare the feature vector with stored feature vectors maintained in the data store;
determine, based at least in part on the comparison, the item and a seller of the item; and
associate the image with the item and the seller of the item.

10. The non-transitory computer-readable storage medium of claim 1, wherein:

the first image further includes a representation of a second item,
the instructions when executed by the processor further causing the processor to at least:
determine the second item represented in the first image;
determine a third seller that offers the second item for sale; and
in response to the request from the second user, send for presentation to the second user the first image and third seller information, wherein the third seller information identifies the third seller as the seller of the second item represented in the first image.

11. The non-transitory computer-readable storage medium of claim 10, the instructions when executed by the processor further causing the processor to at least:

send for presentation to the second user a first purchase control that is selectable to initiate a first purchase of the item from the first seller; and send for presentation to the second user a second purchase control that is selectable to initiate a second purchase of the second item from the third seller.

12. A computing system, comprising:
one or more processors; and
a memory coupled to the one or more processors and storing program instructions that when executed by the one or more processors cause the one or more processors to perform a method comprising:
receiving from a first seller, item information for an item offered for sale by the first seller, wherein the item information includes at least a source Uniform Resource Locator ("URL") associated with the item;
storing the item information for the item in an item catalog data store maintained by a management service;
subsequent to storing, receiving from a first user, a first image, wherein:
the first image includes a first URL; and
the first user and the first seller are different;
comparing the first URL with the source URL;
determining, based at least in part on the comparison, that an item represented in the first image corresponds with the item offered for sale by the first seller;
in response to determining that the item represented in the first image corresponds with the item offered for sale by the first seller, associating the first image with at least one of the item, the item information, or the first seller;
subsequent to associating the first image with at least one of the item, the item information, or the first seller, receiving a request from a second user, wherein the second user is a different user than the first user; and in response to receiving the request from the second user, sending for presentation to the second user the first image, an identification of the first seller, and a purchase control that is selectable to initiate a purchase of the item from the first seller.

13. The computing system of claim 12, the method further comprising:

determining that the item is available for purchase from a second seller; and sending for presentation to the second user an option to select to purchase the item from the first seller or the second seller.

14. The computing system of claim 12, wherein:

determining further includes:

sending a request for confirmation that the first image includes a representation of the item; and receiving a confirmation that the first image includes a representation of the item; and determining that the item represented in the first image corresponds with the item is further based at least in part on the confirmation.

15. The computing system of claim 12, the method further comprising:

subsequent to sending for presentation to the second user the first image, receiving a selection of the purchase control; and in response to receiving the selection of the purchase control, facilitating a purchase of the item, wherein the purchase is between the second user and the first seller, and the first seller delivers the item to the second user.

16. The non-transitory computer-readable storage medium of claim 2, wherein the first item information further indicates a defined period of time for the first advertising amount.

17. The computing system of claim 12, wherein the item information further indicates an advertising amount the first seller is willing to pay to advertise the item.

* * * * *